US008615415B2

(12) United States Patent
Deguchi et al.

(10) Patent No.: US 8,615,415 B2
(45) Date of Patent: Dec. 24, 2013

(54) WORKING INFORMATION PROCESSING SYSTEM, DEVICE, METHOD, AND COMPUTER PROGRAM

(75) Inventors: Hikaru Deguchi, Tokyo (JP); Yoshikazu Takasaki, Ashiya (JP); Taketoshi Nakabayashi, Tokyo (JP)

(73) Assignee: Mekiki Creates Co., Ltd., Tokyo (JP)

( * ) Notice: Subject to any disclaimer, the term of this patent is extended or adjusted under 35 U.S.C. 154(b) by 1373 days.

(21) Appl. No.: 11/587,400

(22) PCT Filed: Apr. 19, 2005

(86) PCT No.: PCT/JP2005/007453
§ 371 (c)(1),
(2), (4) Date: Oct. 24, 2006

(87) PCT Pub. No.: WO2005/106803
PCT Pub. Date: Nov. 10, 2005

(65) Prior Publication Data
US 2007/0168488 A1 Jul. 19, 2007

(30) Foreign Application Priority Data

Apr. 30, 2004 (JP) ................................. 2004-136946
Oct. 8, 2004 (JP) ................................. 2004-296607

(51) Int. Cl.
*G06Q 10/00* (2012.01)
*G06F 7/00* (2006.01)

(52) U.S. Cl.
USPC ............................. 705/7.11; 705/5; 235/376

(58) Field of Classification Search
None
See application file for complete search history.

(56) References Cited

U.S. PATENT DOCUMENTS

| | | | | |
|---|---|---|---|---|
| 5,468,946 A | * | 11/1995 | Oliver | 235/462.07 |
| 5,717,867 A | * | 2/1998 | Wynn et al. | 705/32 |
| 5,905,580 A | * | 5/1999 | Cok et al. | 358/302 |
| 5,999,493 A | * | 12/1999 | Olson | 368/47 |
| 6,499,114 B1 | * | 12/2002 | Almstead et al. | 714/25 |
| 6,751,650 B1 | * | 6/2004 | Finch et al. | 709/203 |
| 6,985,779 B2 | * | 1/2006 | Hsiung et al. | 700/19 |

(Continued)

FOREIGN PATENT DOCUMENTS

| | | |
|---|---|---|
| CN | 1329291 A | 1/2002 |
| JP | H06-318278 | 11/1994 |

(Continued)

*Primary Examiner* — Ryan Zeender
*Assistant Examiner* — Dana Amsdell
(74) *Attorney, Agent, or Firm* — Manabu Kanesaka

(57) ABSTRACT

To provide a system for grasping a working state of engaged workers via a space-saving low-cost communication network even when there is no space for placing a dedicated terminal device used for a network time recorder or it is impossible to employ the dedicated terminal device because of the cost.

A working information generation device (10) generates and outputs working information including generation device information for each predetermined time with different contents. Next, the working information outputted is acquired by a working information acquisition device (20). The acquisition device information is added to the working information so as to obtain working information, which is sent to a predetermined working information collection device (30). The working information collection device (30) receives the working information which has been sent, identifies a working destination in the received working information, and identifies a worker who has worked in the working destination from the acquisition device information in the working information. After this, the identified working destination and the worker are recorded as working information in the working information collection device (30). Furthermore, the working information is sent to a service rating management device (60).

11 Claims, 19 Drawing Sheets

(56) References Cited

U.S. PATENT DOCUMENTS

| | | |
|---|---|---|
| 7,156,311 B2 * | 1/2007 | Attia et al. ............... 235/462.46 |
| 7,369,685 B2 * | 5/2008 | DeLean ......................... 382/118 |
| 7,430,003 B2 * | 9/2008 | Nichols et al. .............. 348/231.3 |
| 2003/0065805 A1 * | 4/2003 | Barnes, Jr. .................... 709/231 |
| 2005/0131745 A1 * | 6/2005 | Keller et al. ...................... 705/7 |

FOREIGN PATENT DOCUMENTS

| | | |
|---|---|---|
| JP | 2002-288402 | 10/2002 |
| JP | 2003-91626 | 3/2003 |
| JP | 2004-80488 | 3/2004 |

* cited by examiner

FIG. 11

- Authentication information generation device DB

| Acquisition device ID | Place where set up (work site) Name or personal name | Place where set up (work site) Address | Telephone number | ... |
|---|---|---|---|---|
| A0001 | Shukko KK | Saitama Prefecture .... | 048 .... | |
| | | | | |
| | | | | |

FIG. 12

- Authentication information acquisition device DB

| Acquisition device ID | Holder (worker) Personal name | Holder (worker) Address | Telephone number | . . . |
|---|---|---|---|---|
| B0001 | Shukko Ikuyo | Tokyo ..... | 03 ..... | |
| | | | | |
| | | | | |

WORKING INFORMATION PROCESSING SYSTEM, DEVICE, METHOD, AND COMPUTER PROGRAM

FIELD OF TECHNOLOGY

The present invention relates to technology for collecting data of working circumstances of workers, and in particular, relates to a technology that is well-suited for identifying who worked when and where.

BACKGROUND TECHNOLOGY

So-called network time recorders, which are made so as to perform attendance management such as of the times of reporting and leaving of employees over a communication network, have been used from the past. As a means for attendance management such as of the times of reporting and leaving of employees using such a network time recorder, for example, there is proposed a system constituted by an employee ID card, a dedicated terminal having a card reader, and a management personal computer, which was made so as to perform attendance management of employees by reading the employee code recorded on the employee ID card from the dedicated terminal having a card reader set up at the entrance/exit when an employee reports or leaves, or the like, inputting the reporting and leaving data, vacation data, and the like, corresponding to the employee code and recording it in memory of the dedicated terminal, transmitting the data recorded in the dedicated terminal to a management device, and collecting that data at the management device (See Patent Document 1).

Patent Document 1: Publication of Japanese Unexamined Patent Application No. H9-115021

DISCLOSURE OF THE INVENTION

Problems the Invention Attempts to Solve

However, in the above-described means for attendance management of employees by network time recorder, it was necessary to make it read in the employee ID card for employee authentication when acquiring the work information of reporting and leaving of the employee. Therefore, there was a problem that a dedicated terminal equipped such as with a card reader for attendance management and a touch-type panel for performing operations of input such as of ID and password became necessary.

Particularly in small-scale shops where the backyard is narrow and there is little space to put things, and the like, it was difficult to secure space for setup of such a dedicated terminal, and it was difficult to perform attendance management of employees using a network time recorder.

Also, recently, there is increased work (work behavior) outside the company by dispatched employees and mobile employees such as home health care personnel and companions, technicians, and the like. However, it is not possible to provide time recorders at those work sites on account of the expense of the terminal and the space to put it, and the like, and it is not possible to ascertain these working circumstances accurately.

Therefore, at present, the labor time and the compensation for that is being computed by self-reporting by the mobile workers and work sites. However, because there are many cases when the labor time is by self-reporting, there was a problem of becoming hotbeds of illegality, and the like.

Therefore, in applications of home health care, and the like, ensuring accuracy in the management of labor time was expected.

The present invention was created in order to solve problems as described above, and it purpose is to provide a scheme by which the working circumstances of workers can be confirmed with little space and low cost, while making the cost inexpensive.

Also, the present invention aims to provide a scheme by which the working circumstances of what worker worked when and what place (work site) can be assuredly ascertained.

Means for Solving the Problems

In order to achieve the above-described purpose, the work information processing system pertaining to one viewpoint of the present invention is a system comprising a work information generation device which is set up at a work site, and a work information acquisition device which is operated by workers who work at that work site, and is characterized in that: the work information generation device has: a time counting means for counting time; an identification information storage means for storing identification information of at least that work information generation device; a work information generation means for generating different work information according to the time based on the time data counted by the above time counting means and the above stored identification information of the work information generation device; and a work information output means for outputting the work information generated by the above work information generation means. The above work information acquisition device has: a work information acquisition means for acquiring the above output work information; a work information storage means for storing the above acquired work information; an output means for outputting prescribed data in a recognizable manner; and an output instruction means for causing the above output means to output the work information stored in the above work information storage means.

The work information processing system pertaining to another viewpoint of the present invention is a system having a work information generation device which is set up at a work site, a work information acquisition device which is operated by workers who work at the work site, and a work information collection device which collects work information of the workers, and is characterized in that: the above work information generation device has: a time counting means for counting time; a first identification information storage means for storing identification information of that work information generation device; a work information generation means for generating different work information according to the time based on at least the time data counted by the above time counting means and the above stored identification information of the work information generation device; and a work information output means for outputting the work information generated by the above work information generation means. The above work information acquisition device has: a work information acquisition means for acquiring the above output work information; a second identification information storage means for storing identification information of workers of that work information acquisition device; and an output means for outputting the acquired work information and worker identification information stored in the above second identification information storage means. The above work information collection device has: a workplace information storage means for storing, relative to one another, identification information of the above work information generation device and place information of where that work information generation device is placed; a collection processing means for collecting the work information and worker identification information output from the above work information acquisition device; a specification means for extracting the identification information of the work information generation device and time data included in the acquired work information, and specifying the place information corresponding to the identification information of the work information generation device extracted by referring to the above workplace information storage means; and a working circumstances storage means for storing, relative to one another, the above acquired worker identification information, and time data and place information extracted from the work information.

The work information processing system may be arranged such that: it further has an attendance information management device which is constituted to be capable of connection via communication with the above work information collection device; the above work information collection device further has a means for communicating to the above attendance management device the worker identification information and time data and place information stored in the above working circumstances storage means; and the above attendance management device performs processing of attendance information such as working and leaving work of the worker with the communicated time data as work time and place information as workplace information.

Also, the work information processing system may be made such that: the above work information generation means outputs and responds by wirelessly transmitting work information generated by the above work information generation means in accordance with a work information read request from the above work information acquisition means; and the above work information acquisition means acquires work information by receiving work information wirelessly transmitted by the above work information output means.

Also, the work information processing system may be made such that the above work information generation means encodes the work information.

Also, work information processing system may be made such that the above work information acquisition means decodes the acquired encoded work information.

Also, work information processing system may be made such that the above collection processing means decodes the acquired encoded work information.

Also, the above work information output means may output encoded work information to a prescribed display; and the above work information acquisition means may take an image of the encoded work information output to the display.

Also, it may be made such that: the above work information generation means generates by encoding work information; the above work information output means outputs by wirelessly transmitting the encoded work information; and the above work information acquisition means acquires the encoded work information by receiving the wirelessly transmitted work information.

The work information generation device pertaining to one viewpoint of the present invention is characterized by having: a time counting means for counting time; an identification information storage means for storing identification information of at least that work information generation device; a work information generation means for generating different work information according to the time based on the time data counted by the above time counting means and the identification information of the above work information generation device; a work information output means for outputting the work information generated by the above work information generation means.

The work information generation device pertaining to another viewpoint of the present invention is a device used in a work information processing system comprising a work information acquisition device which outputs acquired work information and worker identification information to a work information collection device, and a work information collection device which has a workplace information storage means for storing, relative to one another, the identification information of the above work information generation device and place information of where that work information generation device is placed, and collects work information and worker identification information output from the above work information acquisition device, extracts the identification information of the work information generation device and time data included in that work information, and specifies the place information corresponding to the identification information of the work information generation device extracted by referring to the above workplace information storage means, and is characterized by having: a time counting means for counting time; an identification information storage means for storing identification information of that work information generation device; a work information generation means for generating different work information according to the time based on at least the time data counted by the above time counting means and the above identification information; and a work information output means for outputting the work information generated by the above work information generation means.

The above work information generation means may encode the work information.

Also, the above work information generation means may make the work information into a barcode.

Also, the work information generation means may be made such that the above work information output means transmits the work information by wireless.

Also, the work information generation means may further have a work instruction receiving means for receiving a work information generation instruction from a worker; and when the above work instruction receiving means receives a work information generation instruction from a worker, the above work information generation means may acquire the time data at that time by referring to the above time counting means, and generate the work information based on that time data and identification information.

Also, the work information generation means may be made such that the above work information output means display-outputs the generated work information to a prescribed display for a prescribed time determined in advance.

Also, the work information generation means may be configured such that it further has a storage means for storing the generated work information; and the above output means outputs together a plurality of work information stored in the above storage means.

Also, the work information generation means may further have: a means for receiving a standard time radio wave from a standard radio wave transmission source including standard time data; and a means for correcting the counted time of said time counting means in accordance with the above received standard time radio wave.

The work information collection device pertaining to one viewpoint of the present invention is a device used in a system having a work information generation device which generates and outputs different work information according to the time based on at least time data counted by a time counting means and identification information of that work information generation device, and a work information acquisition device which acquires the output work information and communicates that work information and worker identification information, and is characterized by having: a workplace information storage means for storing, relative to one another, identification information of the above work information generation device and the place information of where that work information generation device is placed; a collection processing means for collecting the work information and worker identification information output from the above work information acquisition device; a specification means for extracting the identification information of the work information generation device and time data included in the acquired work information, and specifying the place information corresponding to the identification information of the work information generation device extracted by referring to the above workplace information storage means; and a working circumstances storage means for storing, relative to one another, the above acquired worker identification information, and time data and place information extracted from the work information.

The above work information collection device may further have a means for performing processing of attendance information such as reporting for work and leaving work of the worker with the acquired time data as work time and place information as workplace information.

The work information processing method pertaining to one viewpoint of the present invention is a method executed by a work information generation device having an identification information storage means for storing identification information of that work information generation device, and a work information acquisition device having a work information storage means for storing work information, and is characterized in that: the above work information generation device performs processing to count time by a time counting means; the above work information generation device performs processing to generate different work information according to the time based on the time data counted by the above time counting means and the identification information of the work information generation device stored in the above identification information storage means; the above work information generation device performs processing to output the generated work information; the above work information acquisition device performs processing to acquire the output work information; the above work information acquisition device performs processing to store the above acquired work information in the above work information storage means; and the above work information acquisition device performs processing to cause a prescribed output means to output the work information stored in the above work information storage means.

The work information processing method pertaining to another viewpoint of the present invention is a method executed by a work information generation device having a first identification information storage means for storing identification information of that work information generation device, a work information acquisition device having a second identification information storage means for storing identification information of workers of that work information acquisition device, and a work information collection device having a workplace information storage means for storing, relative to one another, identification information of the work information generation device and place information of where that work information generation device is placed, and is characterized in that: the above work information generation device performs processing to count time by a time counting means; the above work information generation device performs processing to generate different work information according to the time based on at least the time data counted by the above time counting means and the identification information of the work information generation device stored in the above first identification information storage means; the above work information generation device performs processing to output the work information generated by the above work information generation means; the above work information acquisition device performs processing to acquire the above output work information; the above work information acquisition device performs processing to output the acquired work information and the worker identification information stored in the above second identification information storage means; the above work information collection device performs processing to collect the work information and worker identification information output from the above work information acquisition device; the above work information collection device performs processing to extract the identification information of the work information generation device and time data included in the acquired work information, and specify the place information corresponding to the identification information of the work information generation device extracted by referring to the above workplace information storage means; and the above work information collection device performs processing to store, relative to one another, in a working circumstances storage means the above acquired worker identification information, and the time data and place information extracted from the work information.

The work information processing method pertaining to yet another viewpoint of the present invention is a method executed by a device constituted to be capable of communication with a work information generation device which generates and outputs different work information according to the time based on at least time data counted by a time counting means and identification information of that work information generation device, and a work information acquisition device which acquires the output work information and communicates that work information and worker identification information, and having a workplace information storage means for storing, relative to one another, the identification information of the above work information generation device and the place information of where that work information generation device is placed, and is characterized by performing: processing to collect the work information and worker identification information output from the above work information acquisition device; processing to extract the identification information of the work information generation device and time data included in the acquired work information, and specify the place information corresponding to the identification information of the work information generation device extracted by referring to the above workplace information storage means; and processing to store, relative to one another, in a working circumstances storage means the above acquired worker identification information, and the time data and place information extracted from the work information.

The computer program pertaining to one viewpoint of the present invention is characterized by causing to be executed on a computer having an identification information storage means for storing identification information of at least that work information generation device: processing to count time; processing to generate different work information according to the time based on the above counted time data and the identification information stored in the above identification information storage means; and processing to output the above generated work information.

The computer program pertaining to another viewpoint of the present invention is a computer program for making a computer function as a device used in a work information processing system comprising a work information acquisition device which outputs acquired work information and worker identification information, and a work information collection device which has a workplace information storage means for storing, relative to one another, identification information of the above work information generation device and place information of where that work information generation device is placed, and collects work information and worker identification information output from the above work information acquisition device, extracts the identification information of the work information generation device and time data included in that work information, and specifies the place information corresponding to the identification information of the work information generation device extracted by referring to the above workplace information storage means, and it is characterized by causing to be executed on the computer: processing to count time; processing to generate different work information according to the time based on at least the above counted time data and the identification information stored in the above identification storage means; and processing to output the above generated work information.

The computer program pertaining to another viewpoint of the present invention also may cause the output of the generated work information to be executed wirelessly.

The computer program pertaining to yet another viewpoint of the present invention is a computer program for making a computer function as a device constituted to be capable of communication with a work information generation device which generates and outputs different work information according to the time based on at least time data counted by a time counting means and identification information of that work information generation device, and a work information acquisition device which acquires the output work information and communicates that work information and worker identification information, and having a workplace information storage means for storing, relative to one another, the identification information of the above work information generation device and the place information of where that work information generation device is placed, and is characterized by causing to be executed on the computer: processing to collect the work information and worker identification information output from the above work information acquisition device; processing to extract the identification information of the work information generation device and time data included in the acquired work information, and specify the place information corresponding to the identification information of the work information generation device extracted by referring to the above workplace information storage means; and processing to store, relative to one another, in a working circumstances storage means the above acquired worker identification information, and the time data and place information extracted from the work information.

Effect of the Invention

In accordance with the present invention, the working circumstances of workers such as employees can be ascertained assuredly and efficiently using a simple and inexpensive configuration.

PREFERRED EMBODIMENTS FOR IMPLEMENTING THE INVENTION

Below, as one embodiment of the present invention, one example of a system constituted by a work information generation device set up at a work site and a work information acquisition device operated by workers who work at the work site is explained while referring to the drawings. FIG. 1 is a generalized drawing showing one example of the work authentication system pertaining to the embodiment of the present invention. Also, FIG. 2 is a functional block drawing of the work information generation device and work information acquisition device used in the work authentication system pertaining to the present embodiment.

The work authentication system in the present embodiment is constituted by a liquid crystal barcode display device (below called "barcode-attached table clock") 10 as the work information generation device and a camera-attached portable telephone device 20A as the work information acquisition device The barcode-attached table clock 10 is a terminal which is set up at the work site where the workers such as employees work, and the functional block shown in FIG. 2 can be constituted by a CPU (Central Processing Unit), a computer program executed by the CPU, and internal memory such as RAM and ROM which can store the computer program and prescribed data, and the like.

The functional block shown in FIG. 2 is constituted by a time counting part 11, work information generation part 12, work information output part 13, work information display part 14, standard time radio wave receiving part 15, time counting information correction part 16, log information storage part 17, generation device information storage part 18, and work information display instruction part 19.

The time counting part 11 is a clock means for counting time. This time counting part 11 is a so-called radio wave clock which corrects the time counting information (for example, year, month, day, hours, minutes, and seconds) by receiving a standard radio wave transmitted by a standard radio wave transmission station 100.

The work information generation part 12 performs processing to generate work information including at least the identification information (ID, etc.) of the barcode-attached table clock 10. This work information in the present embodiment is a barcode. The identification information of the barcode-attached table clock 10 is information consisting of specific characters, numbers, etc., which are applied in order to specify each barcode-attached table clock 10. Accordingly, with the barcode-attached table clock 10, details including the present time output by the time counting part 11 and the identification information can be converted into a barcode as work information. By this, for the generated barcode information, a different barcode comes to be generated each time with the present time as a key.

The data included in the work information is not limited to this, and it may be generated including log data created by the log information storage and processing part 17 and stored in the internal memory.

Here, as the barcode as work information generated by the work information generation part 12, a two-dimensional barcode can be used. As the two-dimensional barcode, a QR code, Veri-code, or the like, can be used. For the generation of this barcode, the work information generation part 12 can generate the barcode following the USS standard, or the like.

The barcode is not limited to a two-dimensional barcode, and it may be a one-dimensional barcode, and as the one-dimensional barcode, a JAN code, EAN-128 code, or the like, may be used.

The work information output part 13 performs processing to have the generated work information output by the work information display part 14. Also, the work information display part 14 performs processing to display the work information output by the work information output part 13 as recognizable image data. The output is not necessarily limited to image, and for example, it may be made such that the work information output part 13 outputs with audio from a speaker, or the like.

In the present embodiment, liquid crystal is used as the part for display of the barcode as work information, but EL (electroluminescence) or another light-emitting element also can be used.

The standard time radio wave receiving part 15 performs processing to receive a standard radio wave based on Japanese Standard Time. Also, the clock information correction part 16 performs processing to correct the time information (time and calendar) of the time counting part 11 based on the standard radio wave received by the standard time radio wave receiving part 15.

The log information storage and processing part 17 performs processing to store in the internal memory a log in which the time counting information counted by the time counting part 11 was changed into any form physically rather than that by the time counting information correction part 16, and a log of when the power to the barcode-attached table clock 10 was interrupted. Concretely, a button (or knob), or the like, not illustrated, for time correction can be provided on the bottom of the barcode table clock 10, and the date and time can be stored in the internal memory as a log. Also, the log information storage and processing part 17 can monitor the power status and can store in the internal memory as a log the date and time when the power was cut from the power outlet.

In order that the logs be retained even in the event that the power was cut, it can be constituted by providing a power storage part such as a capacitor, not illustrated, inside the barcode clock 10 so that the log information storage and processing part 17 and the internal memory can store the logs.

The generation device information storage part 18 is a storage part that can store identification information for specifying each barcode-attached table clock 10. This identification information is information specific to each barcode-attached table clock 10, and for example, it can be stored and set in internal memory such as ROM in advance at the time of shipping of the barcode-attached table clock 10.

The work information display instruction part 19 performs processing to receive an instruction to have the work information displayed by the work information display part 14. That is, when an instruction for display of work information is received by the work information display instruction part 19, the work information generated by the work information generation part 12 is output by the work information output part 13, and is displayed by the work information display part 14. Accordingly, in the case of the present embodiment, the work information is not always displayed by the display part, but for example, by pressing of a display button 10b provided on the top of the barcode-attached table clock 10, an instruction for display of the identification information is relayed to the work information display instruction part 19, and it is displayed only for a fixed time (for example, 10 seconds) set in advance, based on the instruction by this work information display instruction part 19. For this display button 10b, a physical button may be provided, or it may be made with the work information display part 14 as a touch panel with a button displayed on it for pressure-sensitive operation.

By these configurations, the barcode-attached table clock 10 is made so that the standard time radio wave receiving part 15 receives a standard radio wave, the time counting information correction part 16 corrects the time information of the time counting part 11 to the standard time based on the received standard radio wave, and at a prescribed time or when display of work information is instructed by the work information display instruction part 19, the work information generation part 12 refers to the time counting part 11 and the log information storage part 17, and the work information including the generation device information stored in the generation device information storage part 18 is output by the work information output part 13, and is displayed by the work information display part 14.

Also, this barcode-attached table clock 10 should be fixed at the work site in order to prevent any improper movement of the same. Also, the barcode-attached table clock 10 has a power supply cord 10a for supplying power to that device. The plug part (not illustrated) on the end of this power supply cord 10a is inserted into a power outlet of the work site. Also, normally it is made to be operated by being supplied with power from the power outlet.

The present invention is not limited to this, and it may be a battery-type barcode-attached table clock 10.

When power is supplied from this outlet, if it is a so-called information outlet which is provided for connecting to a network, the place where the barcode-attached table clock 10 is set up, is known by assigning an IP address, and it can be determined if it is moved or not.

Also, in the present invention, movement of the barcode-attached table clock 10 can be determined by using position measurement technology such as GPS (Global Positioning System). Also, a weight, or the like, which moves in accompaniment by moving as a pedometer, can be provided inside, and by counting the movement of this weight, or the like, the fact that the barcode-attached clock 10 is moved, can be sensed, and a log of this movement can be stored in the internal memory.

The camera-attached portable telephone device 20A is held and operated by a worker such as an employee who works at the work site, and a functional block having an acquisition part 21, storage part 22, and display part 23 can be constituted by a CPU, computer program, and storage part such as RAM/ROM.

The acquisition part 21 performs processing to read the work information composed of a barcode displayed by the work information display part 14 of the barcode-attached table clock 10. The acquisition part 21, for example, has a CCD camera being an imaging means for taking an image, and a barcode recognition part for decoding the barcode of the image taken by this CCD camera.

The storage part 22 is a storage part that stores the work information read by the acquisition part 21. The work information stored by this storage part 22 can be read out freely by the display part 23 to be described later, and displayed on the display part.

The display part 23 performs processing to display the work information read by the acquisition part 21 and work information stored in the storage part 22. This display part 23, for example, can be constituted by a liquid crystal display panel and a drive circuit for performing control of the display to this liquid crystal display panel.

The camera-attached portable telephone device 20A should be arranged such that in order to obtain a stable image, a custom barcode mode for adjusting the exposure so that the contrast of the barcode as authentication code display is enhanced, adjusting the correction coefficient so that the outline parts are more enhanced, and adjusting the resolution is provided separately from the normal imaging mode intended for photographing people and scenery, and it can be switched by a photographic object switching means.

Next, one example of the method executed by the system shown in FIG. 1 and FIG. 2 is explained based on FIG. 3. FIG.

3 is a sequence drawing showing the flow of processing in the work authentication system pertaining to an embodiment of the present invention, in the case when information composed of a barcode displayed by the barcode-attached table clock 10 being the work information generation device at the work site is acquired by the camera-attached portable telephone device 20A as the work information acquisition device held and operated by a worker such as an employee who works at the work site.

First, the worker goes to the work site where the barcode-attached table clock 10 has been set up in advance, and pushes the display button 10b provided on the top of the barcode-attached table clock 10 to instruct the display of the work information. By this, the barcode-attached table clock 10 receives the instruction for display of work information by the work information display instruction part 19, and the work information generation part 12 generates the work information including the present time of the time counting part 11, the logs stored in the internal memory, and the identification information of the generation device stored in the generation device information storage part 18 (1).

Next, the generated work information including the generation device information is output by the work information output part 13 (2). Also, the output work information is displayed on the work information display part 14 (3). At this time, in the drawing the display part is divided into two parts for the work information and for the time, but the display contents may be made to change on the same display part by the display button 10b described above.

The barcode-attached table clock 10 may be made such that the standard radio wave is received by the standard time radio wave receiving part 15 in advance of generation of the work information (A), and correction of the time information of the time counting part 11 is performed by the time counting information correction part 16 based on the received standard radio wave (B).

Next, when the work information is displayed on the display part of the barcode-attached table clock 10, the worker takes an image of the part displaying the work information using the CCD camera being the acquisition part 21 of the camera-attached portable telephone device 20A, whereby the work information is acquired (4).

At this time, it may be made such that a display lamp is provided using LED, or the like, on the barcode-attached table clock 10, and a green lamp is lit during the photograph-able time, and a red lamp is lit intermittently during the few seconds of changing of the display. By this, it is possible to prevent errors such as not being able to read in the work information correctly during each prescribed time of changing of the display of work information. Also, in the acquisition part 21, the work information consisting of the barcode is recognized by a barcode recognition part, and the read work information is stored for a time in the storage part by the storage part 22 (5).

Next, the worker instructs the display part 23 to have the stored work information displayed on the display part of the camera-attached portable telephone device 20A in order to prove that he/she was working at the prescribed place by the prescribed time established for him/herself (6). Doing thus, the camera-attached portable telephone device 20A reads out the work information stored in the storage part, and displays to its display part where the barcode-attached table clock 10 is set up, as well as the time the work information was acquired, from the work information including the generation device information.

Also, the worker performs an authentication of proper work behavior by showing to a responsible person the information of the workplace and the time when the work information was acquired which are displayed on the display part of the camera-attached portable telephone device 20A (7). The work information displayed on the display part of the camera-attached portable telephone device 20A is decoded by the acquisition part 21 of the camera-attached portable telephone device 20A, and the work time, workplace (ID of barcode-attached table clock), and the like, represented by characters and letters are displayed.

Next, one example of the detailed operations of the work information generation device (barcode-attached table clock) 10 in the work authentication system described above is explained while referring to FIG. 4.

First, in the operation on the side of the work information generation device 10, as shown in FIG. 4, the standard time radio wave receiving part 15 receives a standard radio wave sent by the standard radio wave transmission station 100 (S11).

When the standard time radio wave receiving part 15 receives the standard time radio wave, the time counting information correction part 16 corrects the time counting information (time information) of the time counting part 11 based on the time information of the received standard radio wave (S12).

Next, in the work information display instruction part 19, it is discriminated as to whether or not the display (generation) of work information was instructed by discriminating as to whether or not the display button 10b was pressed (S13). At this time, it may be made such that the receipt of the above standard time radio wave (S11) and the correction of the time counting information (S12) are performed again.

Also, it may be made such that the instruction for display (generation) of work information generates the work information each prescribed time (for example, each one second or one minute) even without pressing the display button 10b provided on the top of the barcode-attached table clock 10.

In the case when there was an instruction for display (generation) of work information (Y) as a result of the discrimination, next the work information generation part 12 acquires the present time counted by the time counting part 11, the log data stored in the internal memory, and the generation device information stored in the generation device information storage part 18, and generates the work information including these data (S14).

On the other hand, in the case when there was no instruction for display (generation) of work information (N) as a result of the discrimination, receipt of the standard time radio wave (S11), correction of the time counting information (S12), and discrimination as to whether or not the display (generation) of work information was instructed are repeated again (S13).

Also, the work information generated by the work information generation part 12 is output by the work information output part 13 so as to be displayed by the work information display part 14. By this, a series of generation processing of work information including the log information of the barcode-attached table clock 10, the generation device information, and the time information terminates (ends).

Next, the operation of the camera-attached portable telephone device 20A is explained while referring to FIG. 5.

First, the acquisition part 21 discriminates as to whether or not work information was acquired by the bar code-attached table clock 10 (S21).

In the case when there was acquisition of work information (Y) as a result of the discrimination, next, the acquisition part 21 discriminates as to whether or not to store the acquired work information in the storage part 22 (S22). By acquisition of the work information, the acquisition part 21 performs decoding of the barcode information as the acquired work information.

On the other hand, in the case when there was no acquisition of work information (N), the acquisition part 21 performs an inquiry display as to whether or not to have work information already stored in the work information storage part 21 displayed on the display part, and discriminates as to whether or not an instruction to have it displayed was input (S23).

In the case when there was an instruction to have the work information displayed on the display part (Y), the display part 23 reads out the work information stored in the storage part, and displays on its display part if it is the ID of the barcode-attached table clock 10 from the work information including the generation device information, as well as the time when the work information was acquired (S24). Also, it may display also the log information at the same time.

On the other hand, in the case when there is no instruction to display stored work information on the display part (N), it discriminates again as to whether work information was acquired or not (S21).

By this, a series of acquisition processing of work information by the camera-attached portable telephone device 20A terminates (ends).

Thus, by the above-described embodiment, by storing, relative to one another, the information of the barcode-attached table clock 10 and its place where set up in the acquisition device information storage part 30, and storing, relative to one another, the identification information of the camera-attached portable telephone device 20B and information of its holder in the acquisition device information storage part 39, it is possible to authenticate when (time) and where (work site) it was performed based on the work information transmitted from the barcode-attached portable telephone device 10B and the identification information of the camera-attached portable telephone device 20B.

Also, if it is a barcode-attached table clock 10, because it goes no further than adding a barcode display function to an ordinary clock, the device can be made compact compared with a dedicated time recorder device, and its cost also can be kept inexpensive.

Also, if it is a barcode-attached table clock 10, if it is a battery type, there is no need to use the facilities of the work site. Also even in the case when power is supplied from a power supply cord, because the power consumption is little, the cost is inexpensive and it becomes possible to place it regardless of the work site.

Also, by making it as a barcode-attached table clock 10, it becomes possible also to fix the clock to the place where set up.

Also, because it is difficult to tamper with it by making the work information a different barcode according to the time, it is possible to make tampering with the work time by workers, difficult.

Also, by making it as a barcode, its reading also can be performed simply and efficiently.

Also, by reading this with a camera-attached portable telephone device 20A and decoding and outputting it in a recognizable manner, the work information can be confirmed on the spot.

Also, by reading it in together with the log data, for example, even in the event that the barcode-attached table clock 10 was stolen and was used improperly outside the place where set up, it is known that the barcode-attached table clock 10 was moved by looking at its log data, and it can be inferred that illegality has been committed.

Next, as another embodiment of the present invention, an example of the case when the working circumstances are managed by providing a work information collection device for collecting work information is explained while referring to the drawings. FIG. 6 is a block drawing showing in general the work information generation device, work information acquisition device, and work information collection device, respectively, which are used in the work authentication system pertaining to the embodiment of the present invention.

This system is realized by a liquid crystal barcode display device (below called "barcode-attached table clock") 10 as the work information generation device, a camera-attached portable telephone device 20B as the work information acquisition device, and a work information collection device (server) 30.

In this case, the camera-attached portable telephone device 20B and the work information collection device (server) 30 are constituted to be capable of communication via a prescribed network 50 such as the Internet. In the explanation of the present embodiment, the parts in common with the previously described embodiment are assigned the same symbols, and their explanations are omitted.

As shown in FIG. 6, the barcode-attached table clock 10 is set up at a work site where workers such as employees work, and it has a time counting part 11, work information generation part 12, work information output part 13, work information display part 14, standard time radio wave receiving part 15, time counting information correction part 16, log information storage part 17, generation device information storage part 18, and work information display instruction part 19.

Also, the camera-attached portable telephone device 20B is held and operated by a worker such as an employee who works at the work site, and it has an acquisition part 21, storage part 22, display part 23, transmission instruction part 24, transmission part 25, and acquisition device information storage part 26.

The transmission instruction part 24 performs processing to instruct to transmit generated work information to the work information collection device (server) 30.

The transmission part 25 performs processing to transmit to the (server) 30 the work information for which a transmission instruction was given by the transmission instruction part 24. By this transmission instruction part 24, acquisition device information being specific identification information applied to the camera-attached portable telephone device 20B is sent attached to the information acquired by that camera-attached portable telephone device 20B from the barcode-attached table clock 10.

Also, as a means for transmitting the acquired work information to the work information collection device (server) 30, the work information acquired by the camera-attached portable telephone device 20B may be transmitted based on the telephone number or IP address of the destination stored in advance in the internal memory of that camera-attached portable telephone device 20B as destination information, it may be transmitted by mail based on an E-mail address, and it can be transmitted by accessing a prescribed Web site based on a URL, and inputting the data there, or the like. By this, the destination information can be stored in advance in that camera-attached portable telephone device 20B. By this, in the case when the destination information is stored in advance in that camera-attached portable telephone device 20B, it is possible to transmit the work information at one's own convenience, and to transmit the work information collected together.

Also, even if it doesn't have the destination information on the side of the camera-attached portable telephone device 20B, it may be made such that the barcode-attached table clock 10 stores the URL, IP address, telephone number or E-mail address of the destination in the internal memory, and encodes including these items of destination information when generating the work information, and on the side of the acquiring camera-attached portable telephone device 20B, it transmits by reading the destination information. By this, when the work information is received on the side of the camera-attached portable telephone device 20B, because the work information can be sent immediately by starting up the prescribed program such as mail or browser by plug-in based on the acquired destination information, it is possible to prevent forgetting to transmit the work information after acquiring it.

As this destination information, in the case when performing attendance management using this system, by specifying such as the URL of the Web site of the attendance management device for performing management of the reporting and leaving times of each employee via the network, it can be transmitted as attendance information for that attendance management.

The acquisition device information storage part 26 is a storage part that can store acquisition device information. This acquisition device information is information applied for identifying each camera-attached portable telephone device 20B, and for example, it may be the telephone number of that camera-attached portable telephone device 20B. Also, it may be a specific serial code.

Also, the work information collection device (server) 30 is constituted to be capable of information exchange with the camera-attached portable telephone device 20, and it has a time counting part 31, work information receiving part 32, work site/worker specification part 33, work information recording part 34, standard time radio wave receiving part 35, time counting information correction part 36, generation device information storage part 37, acquisition device information storage part 38, improper information discrimination part 39, and work information transmission part 40.

The time counting part 31 performs processing to count the date and time. In the present embodiment, it specifies the time of receipt of work information sent from the camera-attached portable telephone device 20B. This time of receipt of work information does not specify the time that the worker came to work at the work site, rather it is used in order to judge whether or not the information specifying the time when the worker came to work at the work site included in that work information is proper in the event of receiving the destination information included in the work information from the camera-attached portable telephone device 20B.

The work information receiving part 32 performs processing to receive the work information sent from the camera-attached portable telephone device 20B. The work information receiving part 32 can perform also processing to decrypt this information in the case when the work information sent from the camera-attached portable telephone device 20B is encrypted. Accordingly, by analyzing the received work information by the work site/worker specification part 33 to be described later, it is possible to specify who performed the operation of reading of work information where and when.

The work site/worker specification part 33 performs processing to specify the work site based on the generation device information storage part 37 to be described later, and likewise to specify the worker based on the acquisition device information storage part 38 to be described later. More specifically, it performs processing to extract the generation device information included in the received work information, specify the place where this work information generation device is set up, that is, the work site, and specify the holder registered to hold this work information acquisition device, that is, the worker, according to the acquisition and generation device information in the received work information.

The work information recording part 34 is a storage part that can store as work information the information of work site and worker specified by the work site/worker specification part 33. The stored work information is disclosed to the user (dispatching company, or the like) managing that worker. Also, this work information is transmitted to an attendance information management device 60 by the work information transmission part 40 to be described later, and it is used in order to perform salary computation for the worker, and the like, using a so-called internet time recorder.

The standard time radio wave receiving part 35 performs processing to receive a standard radio wave based on Japanese Standard Time, just as with the standard time radio wave receiving part 15 in the work information generation device 10.

The time counting information correction part 36 performs processing to correct the time information (time and calendar) of the time counting part 31 to the standard time based on the standard radio wave received by the standard time radio wave receiving part 35, just as with the time counting information correction part 16 in the work information generation device 10.

The generation device information storage part 37 is a storage part that stores, relative to one another, the generation device information and information of its place where set up. As something to show the relation between the generation device information and the information of its place were set up, for example a work information generation device database 37A as shown in FIG. 11 can be imagined. In this work information generation device database 37A, it is made such that a generation device ID as the generation device information in the work information, and the name or personal name, address, telephone number, and the like, of the place where that generation device is set up (work site) can be stored. Accordingly, if the generation device information is known, the name or personal name, address, telephone number, and the like, of where that generation device is set up can be specified.

The acquisition device information storage part 38 is a storage part that stores, relative to one another, the acquisition device information and information of its holder. As something to show the relation between the acquisition device information and the information of its holder, for example a work information acquisition device database 38A as shown in FIG. 12 can be imagined. In this work information acquisition device database 38A, an acquisition device ID as the acquisition device information in the work information, and the personal name, address, telephone number, and the like, of the holder of that acquisition device (worker) are registered. Accordingly, if the acquisition device information is known, the personal name, address, telephone number, and the like, registered for holding of that acquisition device can be specified.

The improper information discrimination part 39 performs processing to discriminate as to whether or not the work information received based on the above time counting part 31 can be trusted. That is, it performs processing to compare the time the worker worked at the work site included in the work information and the time counting part 31 having received the work information of the work information collection device (server) 30, and to discriminate as improper information in the event that there is a big difference at or above a prescribed time between the two times.

The work information transmission part 40 performs processing to transmit the work site and worker information recorded in the above work information recording part 34 as work information to the attendance information management device 60. It may be made such that the transmission of work information to the attendance information management device 60 is performed only in the case when instructed and registered by the one managing the worker (dispatching company, or the like).

Here, explaining briefly about the time recorder function provided by the attendance information management device 60, the time recorder function, as described above, inputs the time of reporting for work and leaving of work, and the like, of the employees, relative to one another, to the IDs for identification of the employees, and performs tabulation of the work time of each employee and tabulation of total labor time, and the like, based on work plan data for performing management of work plans such as reporting and leaving plans and vacation plans of employees, and work performance data for performing management of actual leaving time (work performance) of employees.

Next, one example of the method executed by the system shown in FIG. 1 and FIG. 6 is explained based on FIG. 7. FIG. 7 is a sequence drawing showing the flow of processing in the system pertaining to an embodiment of the present invention, in the case when the work information displayed by the barcode-attached table clock 10 placed at the work site is acquired by the camera-attached portable telephone device 20B held and operated by a worker such as an employee, and this acquired work information is transmitted to the work management server 30, and furthermore in the case when the work management server 30 transmits the information to the attendance information management device 60.

First, at the work site, the work information generation part 12 refers to the time counting part 11 and log information storage part 17, and generates work information including the generation device information stored in the generation device information storage part 18 (11).

Next, the work information output part 13 display-outputs the generated work information including the generation device information by means of the work information display part 14 (12).

In the present embodiment, it was made that the work information is displayed by the work information display part 14, but the work information may be acquired wirelessly by attaching a wireless transmitter such as Bluetooth to the barcode-attached table clock 10, and attaching a wireless receiver on the side of the camera-attached portable telephone device 20B.

Also, in the barcode-attached table clock 10, the standard radio wave is received by the standard time radio wave receiving part 15 in advance of generation of the work information (A), and correction of the time information of the time counting part 11 is performed by the time counting information correction part 16 based on the received standard radio wave (B).

Next, when the work information is displayed on the display part of the barcode-attached table clock 10, the worker working (reporting for work) at the work site confirms the display of the display lamp provided on the barcode-attached table clock 10, and with the time when the green lamp is lit as the time when the work information can be acquired, the information is acquired by taking an image of this work information part including the time display part using the CCD camera which is the acquisition part 21 of the camera-attached portable telephone device 20B (13). In the case when the red lamp is lit intermittently, it is made such that the acquisition of the information is not performed because the display of work information will change in a few seconds. By this, the work information can be avoided while avoiding an acquisition error due to changing of the work information each prescribed time.

Next, in the camera-attached portable telephone device 20B, it is confirmed as to whether or not the destination information is included in the acquired work information (14). As a result, in the case when the destination information is included, that destination information is extracted, also, in the case when the destination information is not included in the work information, the destination information registered in advance in that camera-attached portable telephone device 20B is searched by the transmission instruction part 24, and the destination information of the work information is instructed (15).

In the camera-attached portable telephone device 20B, when reading of destination information or instruction of destination is performed, next reference is made to the acquisition device information storage part 26, and creation of work information having added that acquisition device information to this work information is performed (16). Also, this work information is transmitted to the work management server 30 by the work information transmission part 26 based on the read destination information or the destination information instructed for transmission (17). At this time, it may be made such that the read work information is stored for a time in the storage part by the storage part 22, and is collected together and transmitted later on.

Next, in the work management server 30, the work information sent by the camera-attached portable telephone device 20B is received by the work information receiving part 32 (18). At this time, the time of receipt of the work information is acquired by the time counting part 31. In the time counting part 31, the time information (time and calendar) is automatically corrected by the time counting information correction part 36 based on the standard radio wave received by the standard time radio wave receiving part 35.

When this work information is received, next it is discriminated as to whether or not the received work information can be trusted by the improper information discrimination part 39 (19). Also, in the case when there is no difference at or above a prescribed time (for example one hour) between the time the worker worked at the work site included in the work information and the time when it was received by the work information receiving part 32, it is judged to be proper work information and specification of the work site and worker is performed, but in the case when there is a large difference between the two, it is judged to be improper information and it is reported to the one managing the worker (dispatching company, or the like).

Also, in the work site/worker specification part 33, the work information properly received by the work information receiving part 32 specifies the work site based on the generation device information storage part 37, and also specifies the worker based on the acquisition device information storage part 38 (20).

The information of work site and worker specified by this work site/worker specification part 33 next is recorded in the work information recording part 34 (21).

Also, the work information registered here is sent to the attendance information management device 60 by the work information transmission part 40 (22). After that, in the attendance information management device 60, worker attendance management is performed by a so-called internet time recorder, and it is used for performing computation of salary, and the like (23).

Next, one example of the detailed operation of the barcode-attached table clock 10 in the work authentication system described above is explained while referring to FIG. 8.

First, in the operation on the side of the work information generation device 10, as shown in FIG. 8, the standard time radio wave receiving part 15 receives a standard radio wave sent by the standard radio wave transmission station 100 (S111). The standard time radio wave received by the standard time radio wave receiving part 15 is sent to the time counting information correction part 16, and the time counting information (time information) of the time counting part 11 is corrected to the standard time based on the standard radio wave received by the time counting information correction part 16 (S112).

Next, in the work information display instruction part 19, it is discriminated as to whether or not the display (generation) of work information was instructed (S113). The display (generation) of this work information is performed each prescribed time, but it may be made such that it is instructed by pressing the display button 10b provided on the top of the barcode-attached table clock 10.

In the case when there was an instruction for display (generation) of work information (Y) as a result of the discrimination, next the work information generation part 12 refers to the log information storage part 17 and the generation device information storage part 18, and generates the work information including the log information and generation device information stored there (S114). On the other hand, in the case when there was no instruction for display (generation) of work information (N) as a result of the discrimination, receipt of the standard time radio wave (S111), correction of the time counting information (S112), and discrimination as to whether or not the display (generation) of work information was instructed are repeated again (S113).

Also, the work information generated by the work information generation part 12 is output by the work information output part 13 so as to be displayed by the work information display part 14 (S115). By this, a series of generation processing of work information including the log information of the barcode-attached table clock 10 and the generation device information terminates (ends).

Next, one example of the processing method on the side of the work information acquisition device is shown in FIG. 9.

In FIG. 9, first, the acquisition part 21 of the camera-attached portable telephone device 20B discriminates as to whether or not work information was acquired by the barcode-attached table clock 10 (S121). In the case when there was acquisition of work information (Y) as a result of the discrimination, the acquisition part decodes this, and in addition, the presence or absence of destination information, whether or not the destination information of the work information collection device to transmit to is included in the acquired work information, is discriminated (S122). On the other hand, in the case when there was no acquisition of work information (N), it is discriminated again as to whether or not work information was acquired (S121).

Next, in the event that the destination information is included (Y) as a result of the discrimination of the presence or absence of destination information, the work information is generated by adding the acquisition device information to the information acquired from the barcode-attached table clock 10 by the transmission part 25 (S124).

On the other hand, in the event that the destination information is not included (N), the transmission instruction part 24 receives an instruction for transmission of work information (S123). Also, the transmission part 25 extracts the acquisition device information by referring to the acquisition device information storage part 26, and generates the transmission information by adding the acquisition device information to the information acquired from the barcode-attached table clock 10 (S124).

After that, the transmission instruction part 24 transmits the generated transmission information based on the destination information (S125).

By this, a series of processing in the camera-attached portable telephone device 20B terminates (ends).

Meanwhile, in the operation on the side of the work information collection device 30, as shown in FIG. 10, first, it is discriminated as to whether or not a standard radio wave sent by the standard radio wave transmission station 100 was received by the standard time radio wave receiving part 35 (S131). As a result, in the case when a standard radio wave was received (Y), next it is discriminated as to whether or not it matches the time counting information in the time counting part 31 (S132). On the other hand, in the case when a standard radio wave is not received (N), the discrimination as to whether or not the standard radio wave was received is repeated attain (S131).

Next, in the case when it matches the time counting information in the time counting part 31 (Y), next it is discriminated as to whether or not transmission information sent by the camera-attached portable telephone device 20B was received by the work information receiving part 32 (S134). On the other hand, in the case when it does not match the time counting information in the time counting part 31 (N), the standard time radio wave received by the standard time radio wave receiving part 35 is sent to the time counting information correction part 36, and correction of the time counting information (time information) of the time counting part 31 is performed based on the standard radio wave received by the time counting information correction part 36 (S132).

When the automatic correction of the time counting information ends, it is discriminated as to whether or not the work information receiving part 32 received the above work information (S134).

When the work information receiving part 32 receives the work information, the improper information discrimination part 39 discriminates as to whether or not there isn't improper behavior by discriminating whether or not there isn't a large time difference between the time the worker worked at the work site included in the work information and the time it was received by the work information receiving part 32 (S135).

In the case when it was judged to be proper work information as a result of the discrimination, the work site/worker specification part 34 specifies the work site based on the generation device information storage part 37, and specifies the worker based on the acquisition device information storage part 38 (S136).

As the processing to specify the workplace, the worker specification part 34 can refer to the generation device information storage part 37 and specify the place of setup corresponding to the generation device information received from the camera-attached portable telephone device 20, whereby it can specify that place of setup as the workplace. Also, as the method of specifying the worker, the worker specification processing part 34 can refer to the acquisition device information storage part 38 and specify the holder of that camera-attached portable telephone device 20 corresponding to the received acquisition device information, whereby it can specify that holder as the worker.

The work site and worker information specified by this work site/worker specification part 33 next is stored in the work information recording part 34 (S137).

Also, the work information registered here is sent to the attendance information management device 60 by the work information transmission part 40 (S138).

By this, a series of acquisition processing of work information on the side of the work information collection device 30 terminates (ends).

Because the present embodiment is explained concerning the case when the work information is acquired by the camera-attached portable telephone device 20A, it was made such that the work information is displayed by the work information display part 14, but it may be made such that the acquisition of the work information is performed by a transmitting and receiving system by wireless LAN such as Bluetooth or infrared communication.

Thus, even by another embodiment, the same effects as in the previously described embodiments can be performed.

Also, collecting the work information by the work information collection device 30, the working circumstances can be confirmed assuredly even when the user, or the like, is not present at the site.

Also, by having the work information transmitted from the workers immediately after arriving, the user, or the like, can ascertain the working circumstances of the workers immediately. By this, for example, it becomes possible have replacements mobilized immediately in places where workers are not mobilized. Also, because the time from mobilization to withdrawal of the workers can be managed assuredly, impropriety of workers or illegal labor circumstances such as unpaid overtime can be ascertained.

Also, if it is made such that the barcode data is decoding processed on the side of the camera-attached portable telephone device 20B, since the work information can no longer be transmitted in the event that the camera-attached portable telephone device 20B could not read the barcode data, it is possible to transmit the work information to the work information collection device 30 after confirming whether or not it could be read in at the worker side.

In the case of using telephone numbers as the acquisition device information in the embodiments described above, it may be made such that the telephone numbers are communicated using the transmission number notification function from the exchange in the communication network of the camera-attached portable telephone device 20B.

Also, although the work information generation device was made as a barcode-attached table clock, the present invention is not limited to this, and as long as it can generate work information like a barcode, and also can output and display this, it can be made as an electronic device having a display part such as a telephone set, facsimile machine, copy machine, and POS register device.

Also, in the example described above, it was explained concerning an example in which a display button 10b is provided and the work information is displayed when this is pressed, but it is not limited to a display button 10b, and it may be made such that the work information generation part 12 regularly displays different work information according to the time on a display, or the like.

Also, the present invention is not limited to barcodes, and it may be encoded information. For example, it may be made such that the present time of the table clock and its identification number are digitally displayed as numbers, and these are read by the camera-attached portable telephone device.

As a method of collecting data from the portable telephone device, even if it is not transmitted via the portable telephone network, the acquired work information may be stored in the internal memory of the portable telephone set, and the data may be collected by connecting a device that can be electrically connected to this (for example stick memory), or the like.

Also, it may be made such that the barcode read on the portable terminal device side is transmitted unchanged as image data to the work information collection device, and decoding processing is performed on the side of the work information collection device.

Also, in the above embodiment, it was explained concerning an example including log data in the barcode, but this is not absolutely necessary, and is optional.

Also, in the above embodiment, it was explained concerning an example containing time data in the barcode, but this is not absolutely necessary, and for example, a prescribed random number may be generated based on the time, and the work information may be made different according to the time using this.

Also, the work information may be encrypted and encoded using a prescribed cryptographic algorithm.

Also, it may be made such that the generated work information can be stored multiply in the internal memory of the barcode-attached table clock 10, and made such that this is collected and displayed.

By this, for example, in both cases when the work information is generated respectively when reporting for work and leaving work, these can be collected and displayed, and these can be transmitted together from the camera-attached portable telephone device 20, and the two pieces of information of reporting for work and leaving work can be acquired efficiently with one operation.

Next, as yet another embodiment of the present invention, an example of the case when the work information is acquired wirelessly is explained while referring to the drawings. FIG. 13 is a generalized drawing showing another case of the work authentication system pertaining to an embodiment of the present invention. Also, FIG. 14 is a block drawing showing in general the work information generation device, work information acquisition device, and work information collection device, respectively, which are used in another example of the work authentication system pertaining to the present embodiment.

In the present embodiment, an IC tag, which is known as a contactless-type data carrier system that performs wireless communication by electromagnetic induction between a responding device and a requesting device, is used.

In this data carrier system, the requesting device reads out various kinds of data such as identification information stored in the responding device. Also, FIG. 15 is a block drawing showing in general the IC tag used in the above work information generation device, and FIG. 16 is a block drawing showing in general the IC tag reading device used in the above work information acquisition device.

The present embodiment is realized by a clock device (below called "IC tag-attached table clock") 110 equipped with an IC tag 70 as a work information generation device, and a portable telephone device (below called "IC tag reading device-attached portable telephone device") 120 equipped with an IC tag reading device 80 as a work information acquisition device, and a work information collection device (server) 30.

In this case, the IC tag reading device-attached portable telephone device 120 and the work information collection device (server) 30 are constituted to be capable of communication via a prescribed network 50 such as the Internet. In the explanation of the present embodiment, the parts in common with the previously described embodiment are assigned the same symbols, and their explanations are omitted.

The IC tag-attached table clock 110 is a terminal set up at a work site where workers such as employees work, and the functional block shown in FIG. 14 can be constituted by a CPU (Central Processing Unit), a computer program executed by the CPU, and internal memory such as RAM and ROM which can store the computer program and prescribed data, and the like.

The functional block shown in FIG. 14 is constituted by a time counting part 111, standard time radio wave receiving part 112, time counting information correction part 113, and IC tag 70.

The time counting part 11 is a clock means for counting time.

This time counting part 11 is a so-called radio wave clock which corrects the time counting information (for example, year, month, day, hours, minutes, and seconds) by receiving a standard radio wave transmitted by a standard radio wave transmission station 100.

The standard time radio wave receiving part 112 performs processing to receive a standard radio wave based on Japanese Standard Time. Also, the clock information correction part 113 performs processing to correct the time information (time and calendar) of the time counting part 11 based on the standard radio wave received by the standard time radio wave receiving part 15.

The IC tag 70, as shown in FIG. 15, comprises a coil 71 as work information output means, and a tag-side control part 72, and the like.

The coil 71 is for performing wireless communication by electromagnetic induction with a coil 81 of the IC tag reading device 80 to be described later. That is, an antenna pattern is formed in the IC tag 70, a resonance circuit is formed by a capacitance element internally installed in the IC chip, and it receives radio waves at a fixed frequency from the IC tag reading device 80, and transmits data stored in the IC tag 70 to the IC tag reading device 80.

The tag-side control part 72 is started up by the power supply of the IC tag-attached table clock 110, and it controls the wireless communication with the IC tag reading device 30. More specifically, the tag-side control part 72 has a generation device information (identification ID) storage part 721, work information generation program storage part 722, work information distribution program 723, and work information generation part 724, and it performs IC chip management processing such as registration, updating, and deletion of work information including the identification ID and time information on the IC chip according to the work information generation program 722, or transmission of the work information registered on the IC chip generated by that work information generation part 724 to the IC tag reading device 30 via the coil 71 according to the work information distribution program.

In the present embodiment, the tag-side control part 72 was made as one which uses the power supply of the IC tag-attached table clock 110, but it may be made such that a power supply circuit, which rectifies the current from the electromagnetic induction caused in the coil 71 and supplies a prescribed voltage to the tag-site control part 72, is provided.

By this, the tag-side control part 72 can be started up by the voltage supplied from the power supply circuit.

The generation device information (identification ID) storage part 721 is a storage part that can store identification information for specifying each IC tag-attached table clock 110. This identification information is information specific to each IC tag-attached table clock 110, and for example, it can be stored and set in internal memory such as ROM in advance at the time of shipping of the IC tag-attached table clock 110.

The work information generation program storage part 722 is a storage part that stores a program for performing processing to generate work information by the work information generation part 724 to be described later.

The work information distribution program 723 is a storage part that stores a program for performing processing to transmit work information generated by the work information generation part 724 and registered in the IC chip, from the above-described coil 71 to the IC tag reading device 30.

The work information generation part 724 performs processing to generate work information including at least the identification information (ID, etc.) of the IC tag-attached table clock 110 and the present time information of the time counting part 111. The identification information of the IC tag-attached table clock 110 is information consisting of specific characters, numbers, etc., which are applied in order to specify each IC tag-attached table clock 110. Accordingly, with the IC tag-attached table clock 110, work information of details including the present time output by the time counting part 111 and the identification information can be generated. By this, the generated work information comes to be generated differently each time with the present time as a key.

The data included in the work information is not limited to this, and it may be generated including log data created by a log information storage and processing part and stored in the internal memory.

By such configuration, first, in the IC tag-attached table clock 110, the standard time radio wave receiving part 112 receives a standard radio wave, and the time counting information correction part 113 corrects the time counting information of the time counting part 111 based on the received standard radio wave. Next, the work information generation part 724 of the IC tag 70 refers to the time counting part 111 each prescribed time, and generates work information including the generation device information stored in the generation device information (identification ID) storage part 721, according to the work information generation program storage part 722. Also, the latest work information is transmitted to the IC tag reading device 30 via the coil 71 according to the work information distribution program 723.

Also, this IC tag-attached table clock 110, just as the barcode-attached table clock 10, should be fixed at the work site in order to prevent impropriety by moving it. Also, the IC tag-attached table clock 110 has a power supply cord 110a for supplying power to that device. The plug part (not illustrated) on the end of this power supply cord 110a is inserted into a power outlet of the work site. Also, normally it is made to be operated by being supplied with power from the power outlet.

The present invention is not limited to this, and it may be a battery-type IC tag-attached table clock 110.

Next, the functional configuration of the IC tag reading device-attached portable telephone device 120 (as work information acquisition device) incorporating the IC tag reading device 80 is explained. This portable telephone is held and operated by a worker such as an employee who works at the work site, and a functional block having an operation part 121, storage part 122, display part 123, communication part 124, acquisition device information storage part 125, and IC tag reading part 80 can be constituted by a CPU, computer program, and storage part such as RAM/ROM.

Also, the IC tag reading device-attached portable telephone device 120 is equipped with an electronic mail transmission and receiving function.

The CPU executes processing based on a prescribed program in accordance with instructions, and the like, input via the operation part 121, and performs instruction and data transfer, and the like, to each functional part. Concretely, for example, the CPU, in accordance with operation signals input via the operation part 121, reads out the program stored in ROM and deploys it in RAM, executes processing based on that program, and outputs to the display part 123 display signals for displaying the processing results whereby those display signals are displayed.

The operation part 121 has buttons necessary for input of numbers or characters, or for functional selection, or the like, and it performs processing to output pressing signals, or the like, of the pressed buttons to the CPU.

In the storage part 122, programs and data, and the like, for realizing various functions of the portable telephone device, are stored, and in addition, it has memory areas for temporarily storing various of programs executed by the CPU and data related to the execution of these programs, and the like.

The display part 123, for example, is a device constituted by organic EL (Electro Luminescence) or LCD (Liquid Crystal Display), or the like, and it performs processing to display various screens based on display signals input from the CPU. This display part 123, for example, can be constituted by a liquid crystal display panel, and a drive circuit for performing display control of this liquid crystal display panel.

The communication part 124 has an antenna (not illustrated) connected, and it performs transmission and receiving of wireless signals with a destination via this antenna.

The acquisition device information storage part 125 is a storage part that can store identification information for specifying each IC tag reading device-attached portable telephone device 120. This identification information is information specific to each IC tag reading device-attached portable telephone device 120, and for example, it can be stored and set in internal memory such as ROM in advance at the time of shipping of the IC tag reading device-attached portable telephone device 120.

The IC tag reading part 80 comprises a coil 81 as work information acquisition means, and an IC tag reading device-side control part 82, and the like, and it performs wireless communication via the coil 81 with the IC tag 70. Concretely, the IC tag reading device-side control part 82 has a work information storage part 821 and an IC tag reading program storage part 822, and it executes wireless communication with the IC tag 70 and receives work information from the IC tag 70 by controlling and changing the current and voltage sent to the coil 81.

The work information storage part 821 is a storage part that stores work information received via the coil 81. The work information stored in this work information storage part 821 can be output to the display part 123 or transmitted from the communication part 124 to an output management server 30 as work information collection device, according to instructions by the operation part 121 described above.

Also, the IC tag reading program storage part 822 is a storage part that stores a program for performing processing to store the work information received via the coil 81 to the work information storage part 821 described above.

Next, one example of the method executed by the system shown in FIG. 13 through FIG. 16 is explained based on FIG. 17. FIG. 17 is a sequence drawing showing the flow of processing in the work authentication system pertaining to an embodiment of the present invention, in the case when work information generated by the IC tag-attached table clock 110 being the work information generation device at the work site is acquired by the IC tag reading device-attached portable telephone device 120 as the work information acquisition device held and operated by a worker such as an employee who works at the work site.

The IC tag-attached table clock 110 set up at the work site refers to the present time output by the time counting part 111 each prescribed time, and generates work information of details including the identification information of the generation device stored in the generation device information storage part 721 (31), and always updates to the latest work information.

At this time, the IC tag-attached table clock 110 may be made such that the standard radio wave is received by the standard time radio wave receiving part 112 in advance of generation of the work information (A), and correction of the time information of the time counting part 111 is performed by the time counting information correction part 113 based on the received standard radio wave (B).

Also, when the worker goes to the work site where the IC tag-attached table clock 110 is set up and approaches the IC tag-attached table clock 110 in a manner so as to hold up one's own IC tag reading device-attached portable telephone device 120, a work information read request is transmitted wirelessly to the IC tag-attached table clock 110 by the IC tag reading device-attached portable telephone device 120 (32).

The IC tag-attached table clock 110 receives the work information read request from the IC tag reading device-attached portable telephone device 120, and responds by outputting the latest work information generated by the work information generation part 724 (33).

In response to this, the IC tag reading device-attached portable telephone device 120 receives the response from the IC tag-attached table clock 110, and acquires the work information (34).

Next, in the IC tag reading device-attached portable telephone device 120, it is confirmed as to whether or not the destination information is included in the acquired work information (35). As a result, in the case when the destination information is included in the work information, that information is read and extracted, also, in the case when the destination information is not included in the work information, the destination information registered in advance in that IC tag reading device-attached portable telephone device 120 is searched, and the destination information of the work information is instructed (36).

In the IC tag reading device-attached portable telephone device 120, when reading of destination information or instruction of destination is performed, next reference is made to the acquisition device information storage part 125, and creation of work information having added that acquisition device information to this work information is performed (37). Also, this work information is transmitted to the work management server 30 by the transmission part 124 based on the read destination information or the destination information instructed for transmission (38). At this time, it may be made such that the read work information is stored for a time by the storage part 122, and is collected together and transmitted later on.

Next, in the work management server 30, the work information sent by the IC tag reading device-attached portable telephone device 120 is received by the work information receiving part 32 (39). At this time, the time of receipt of the work information is acquired by the time counting part 31. In the time counting part 31, the time information (time and calendar) is automatically corrected by the time counting information correction part 36 based on the standard radio wave received by the standard time radio wave receiving part 35.

When this work information is received, in the work site/worker specification part 33, it specifies the work site based on the generation device information storage part 37, and also specifies the worker based on the acquisition device information storage part 38 (40).

The information of work site and worker specified by this work site/worker specification part 33 next is stored in the work information recording part 34 (41).

Also, the work information registered here is sent to the attendance information management device 60 by the work information transmission part 40 (42). After that, in the attendance information management device 60, worker attendance management is performed by a so-called internet time recorder, and it is used for performing computation of salary, and the like (43)

Next, one example of the detailed operation of the IC tag-attached table clock 110 in the work authentication system described above is explained while referring to FIG. 18.

First, in the operation on the side of the IC tag-attached table clock 110 being the work information generation device, as shown in FIG. 18, the standard time radio wave receiving part 112 receives a standard radio wave sent by the standard radio wave transmission station 100 (S151).

The standard time radio wave received by the standard time radio wave receiving part 112 is sent to the time counting information correction part 113, and the time counting information (time information) of the time counting part 111 is corrected to the standard time based on the standard radio wave received by the time counting information correction part 113 (S152).

Also, in the work information generation part 724, reference is made to the present time output by the time counting part 111 each prescribed time, and the work information of details including the identification information of the generation device stored in the generation device information storage part 721 is generated and updated, according to the program stored in the work information generation program storage part 722 (S153).

Next, in the work information generation part 724, it is discriminated as to whether or not there was a work information read request from the IC tag reading device-attached portable telephone device 120, following the program stored in the work information distribution program storage part 723 (S154).

In the case when there was a work information read request as a result of the discrimination (Y), a response is made by outputting the latest work information generated and updated by the work information generation part 724 and wirelessly transmitting it via the coil 71 to the IC tag reading device-attached portable telephone device 120 (S155).

On the other hand, in the case when there was no work information read request (N), receiving of the standard time radio wave (S151), correction of the time counting information (S152), and generation and updating of the work information (S153), and discrimination as to whether or not there was a work information read request from the IC tag reading device-attached portable telephone device 120 is repeated again (S154).

By this, a series of generation processing of work information including the log information of the IC tag-attached table clock 110 and the generation device information terminates (ends).

Next, one example of the processing method on the side of the work information reading device is shown in FIG. 19.

In FIG. 19, first, it is discriminated as to whether or not there was a work information read instruction by the operation part 121 of the IC tag reading device-attached portable telephone device 120 (S161).

In the case when there was a work information read instruction as a result of the discrimination (Y), the work information read request is transmitted to the IC tag-attached table clock 110 up to which the IC tag reading device-attached portable telephone device 120 was held, following the program stored in the IC tag reading program storage part 822 (S162).

On the other hand, in the case when there was no work information read instruction as a result of the discrimination (N), the discrimination as to whether there was work information read instruction is repeated again (S161).

Next, it is discriminated as to whether or not the IC tag reading part 80 of the IC tag reading device-attached portable telephone device 120 received a response of work information via the coil 81 by the IC tag-attached table clock 110 held up to (S163).

In the case when a response of work information was received as a result of the discrimination (Y), the work information is received, and it is stored in the storage part 122 (S164).

On the other hand, in the case when a response of work information was not received as a result of the discrimination (N), the discrimination as to whether or not a response of work information was received is repeated again (S163).

When the work information is acquired, next, the presence or absence of destination information, whether or not the destination information of the work information collection device to transmit to is included in the acquired work information, is discriminated by the communication part 124 (S165).

In the case when the destination information is included as a result of the discrimination (Y), new work information is generated by adding the acquisition device information stored in the acquisition device information storage part 125 to the information acquired from the IC tag-attached table clock 110 (S167).

On the other hand, in the case when the destination information is not included (N), an instruction for transmission of work information is received by the operation part 121 or the communication part 124 (S166). Also, new work information is generated by adding the acquisition device information to the acquired work information (S167).

After that, the communication part 124 transmits the newly generated work information based on the destination information (S168).

By this, a series of processing in the IC tag reading device-attached portable telephone device 120 terminates (ends).

Thus, even by another embodiment, the same effects as in the previously described embodiments can be performed.

Also, in all of the embodiments described above, they were explained concerning examples constituted with the work information collection device and the attendance information management device as separate objects, but it may be made such that management of the workers, working times, and reporting and leaving the workplace, and the like, and processing of the attendance data for salary computation, and the like, are performed by a work information collection device combining these into one object.

The present invention can be used in an attendance management system of work (work behavior) outside the company by dispatched employees and mobile employees such as home health care personnel and companions, technicians, security guards, and route delivery services. Also, because the present invention can discriminate as to who was where, it can be used also in games such as orienteering games.

BRIEF EXPLANATION OF THE DRAWINGS

FIG. 11 is one example showing the structure of the generation device information storage means recorded in the work information collection device in the second system pertaining to an embodiment of the present invention.

FIG. 12 is one example showing the structure of the acquisition device information storage means recorded in the work information collection device in the second system pertaining to an embodiment of the present invention.

EXPLANATION OF THE SYMBOLS

Figure 1:
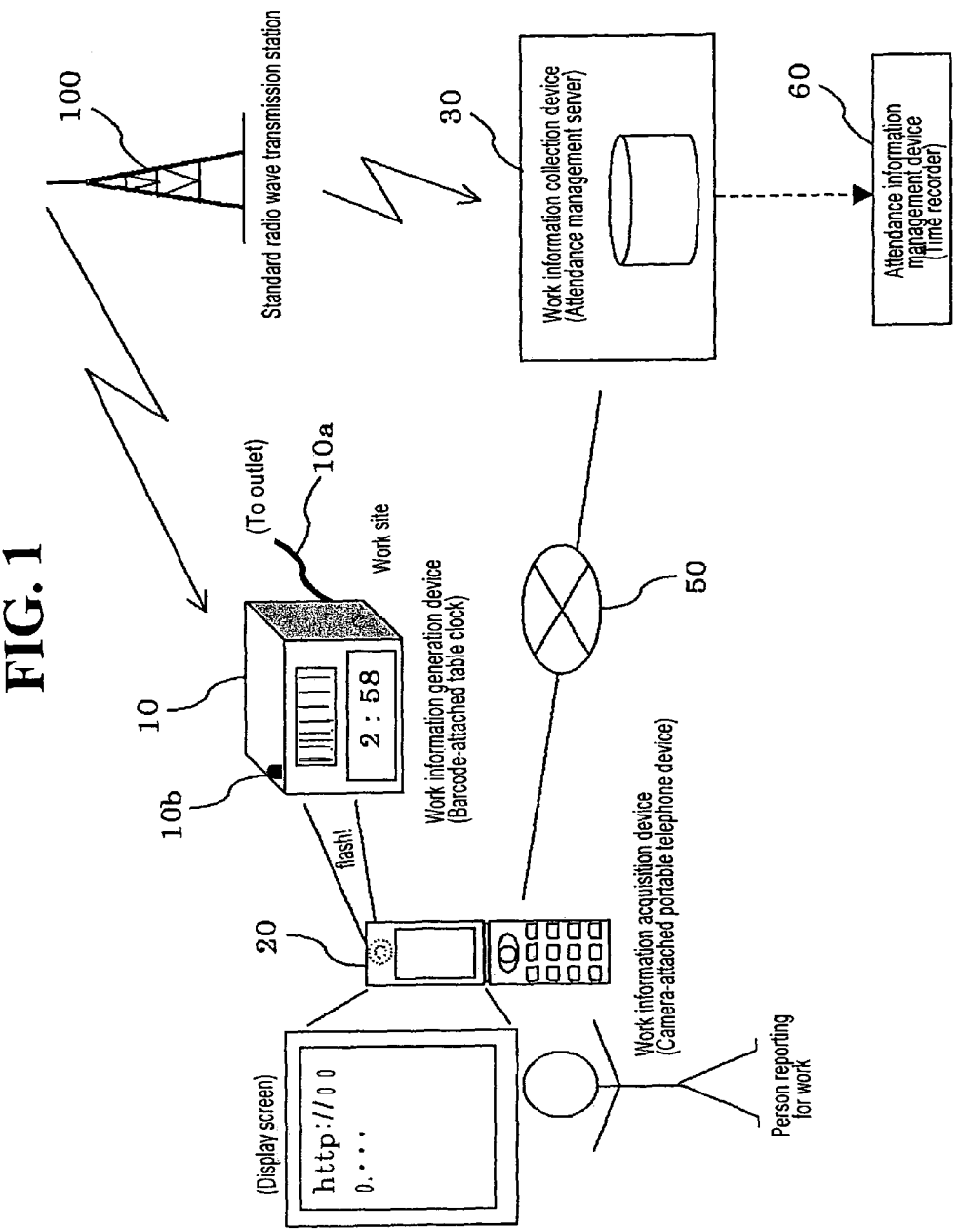
FIG. 1 is a generalized drawing showing over-all an example of one embodiment of a work authentication system pertaining to the present invention.
Figure 2:
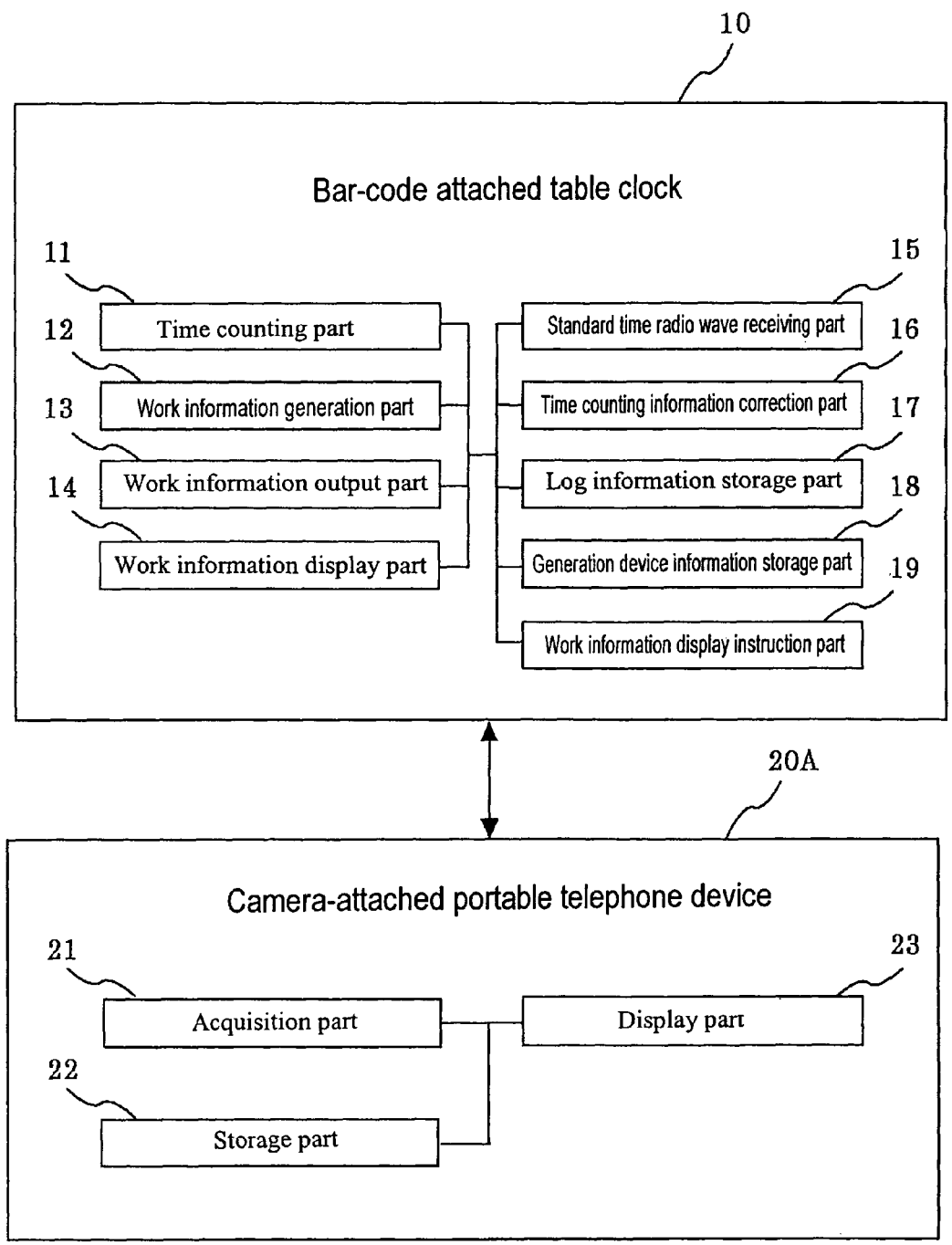
FIG. 2 is a block drawing explaining in general the structure of a first system pertaining to an embodiment of the present invention.
Figure 3:
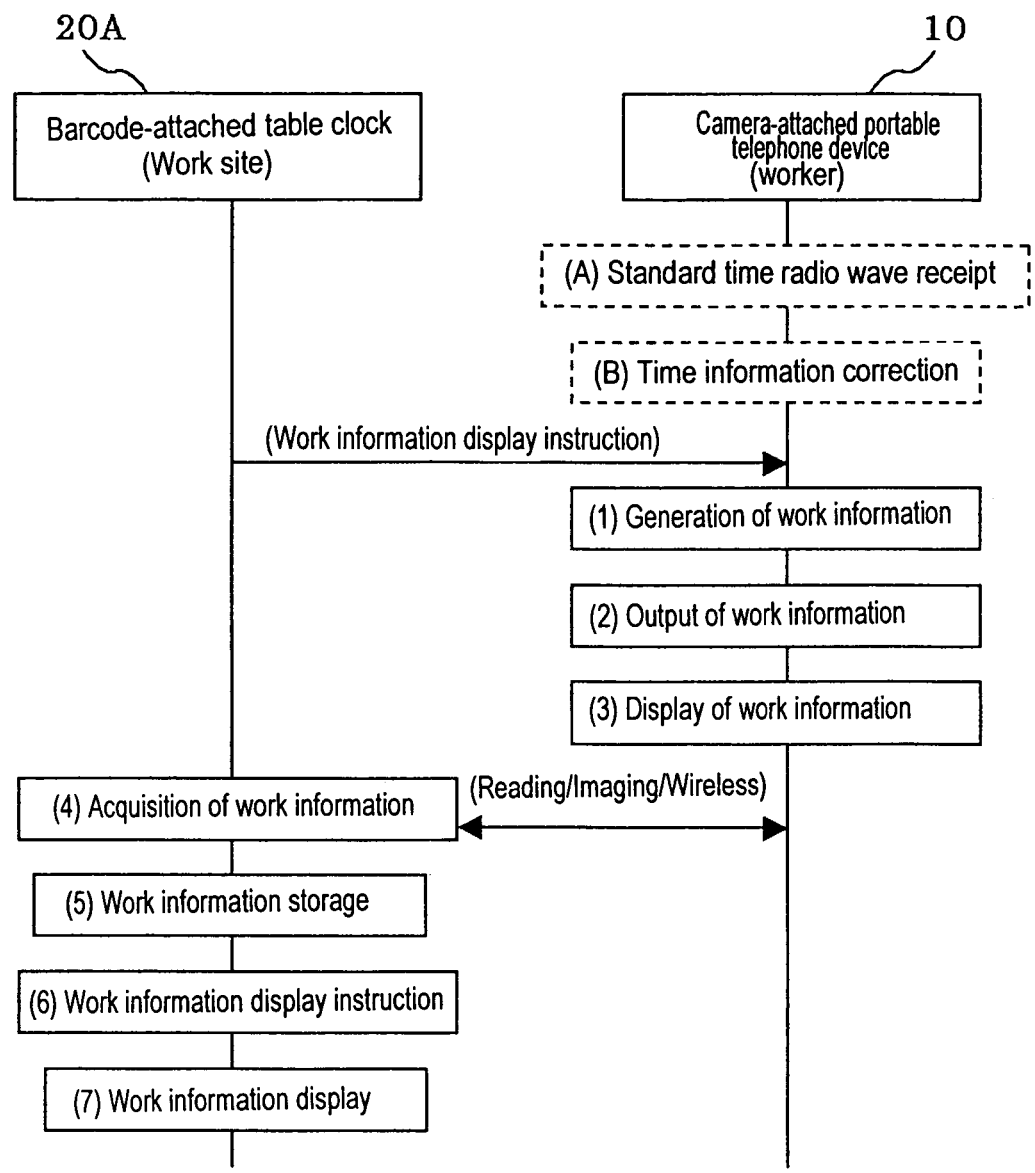
FIG. 3 is a sequence drawing explaining the flow of information in the first system pertaining to an embodiment of the present invention.
Figure 4:
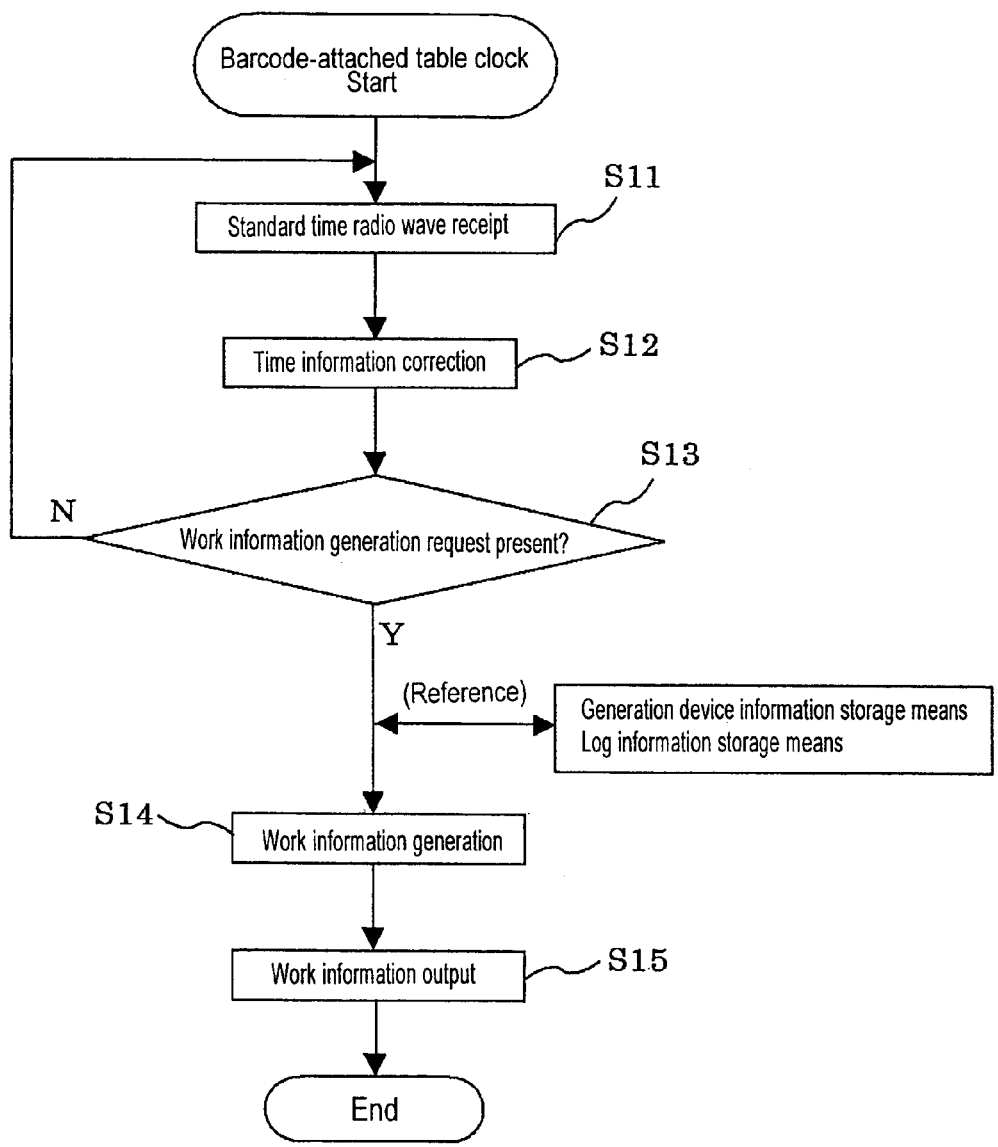
FIG. 4 is a flow chart showing the procedure of the work information generation device in the first system pertaining to an embodiment of the present invention.
Figure 5:
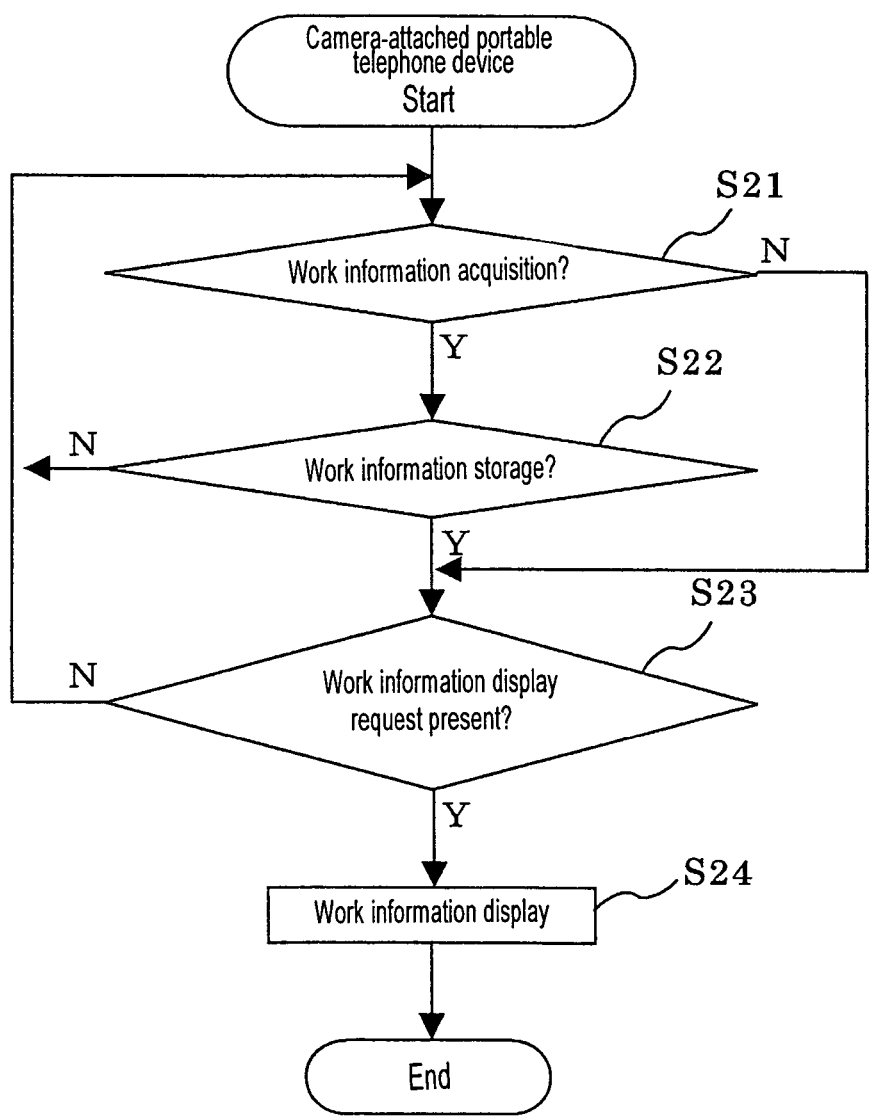
FIG. 5 is a flow chart showing the procedure of the work information acquisition device in the first system pertaining to an embodiment of the present invention.
Figure 6:
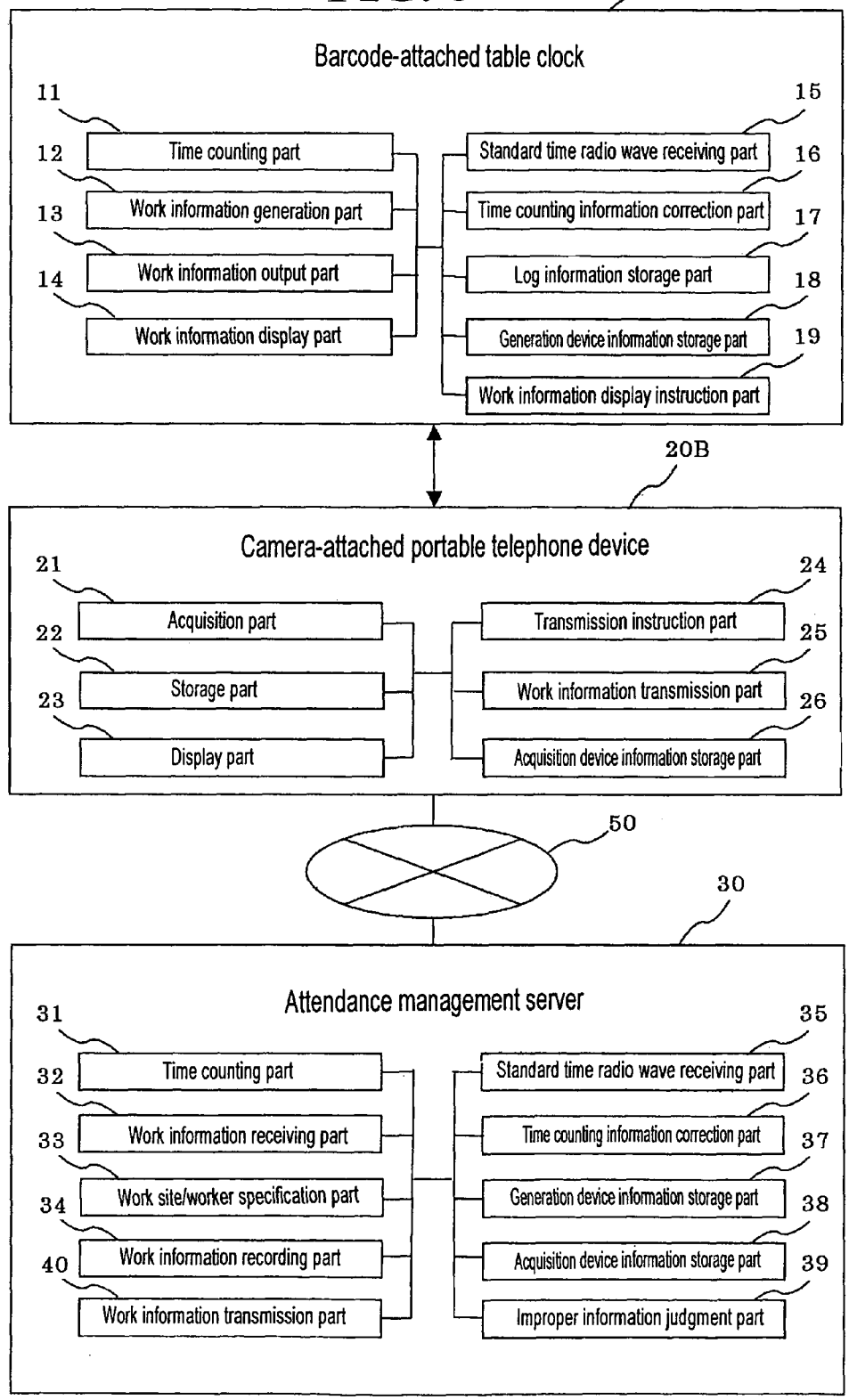
FIG. 6 is a block drawing showing in general the structure of a second system pertaining to an embodiment of the present invention.
Figure 7:
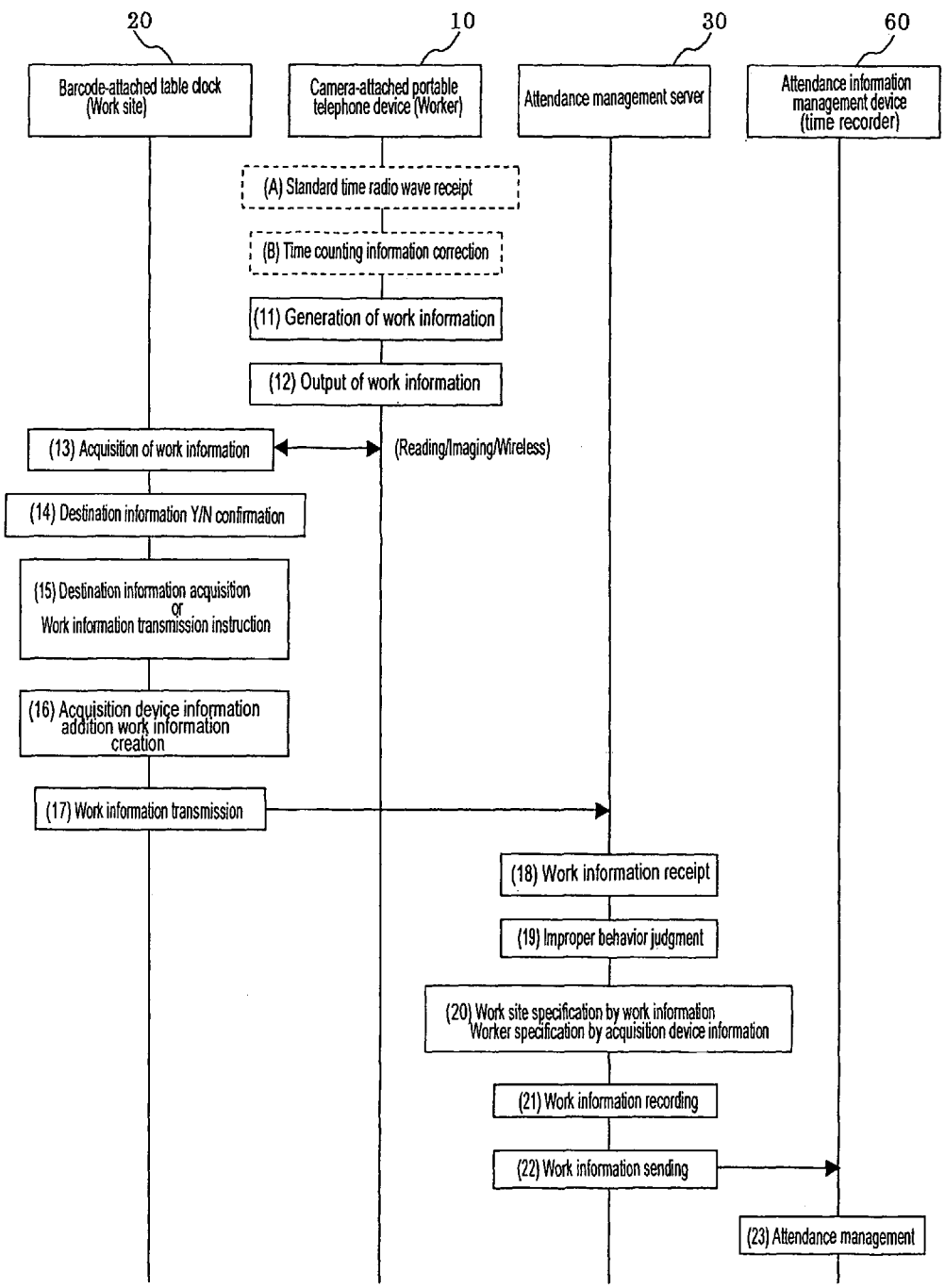
FIG. 7 is a sequence drawing explaining the flow of information in the second system pertaining to an embodiment of the present invention.
Figure 8:
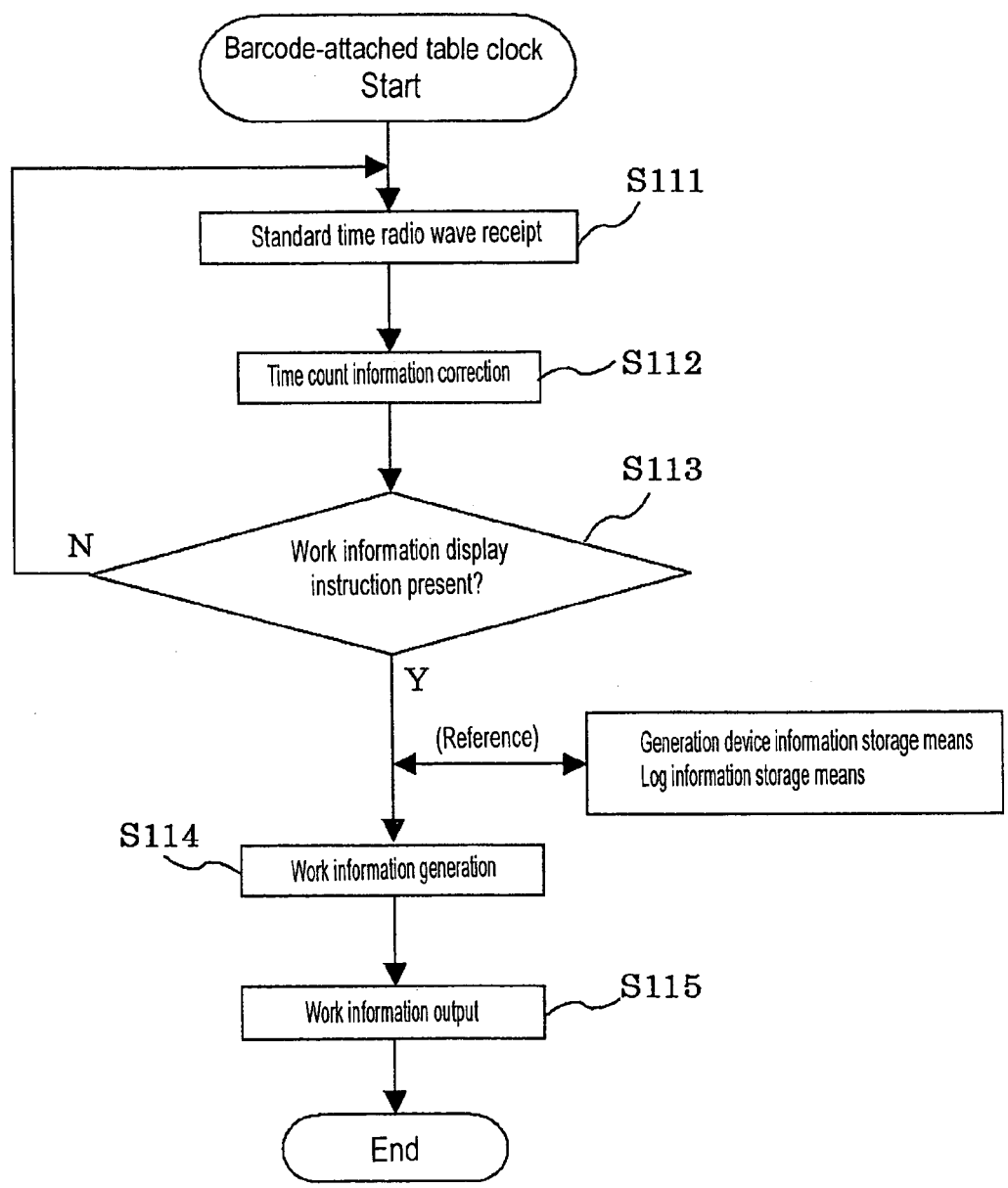
FIG. 8 is a flow chart showing the procedure of the work information generation device in the second system pertaining to an embodiment of the present invention.
Figure 9:
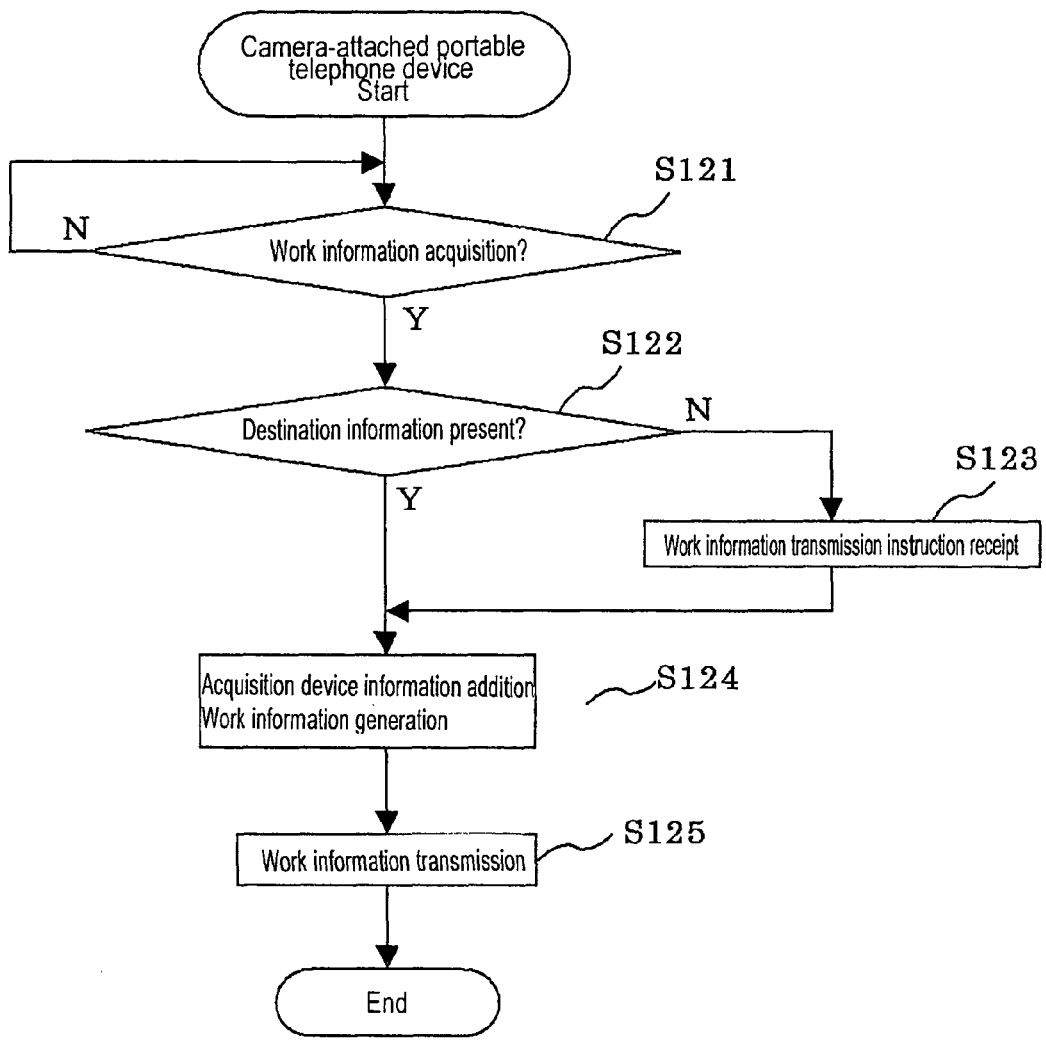
FIG. 9 is a flow chart showing the procedure of the work information acquisition device in the second system pertaining to an embodiment of the present invention.
Figure 10:
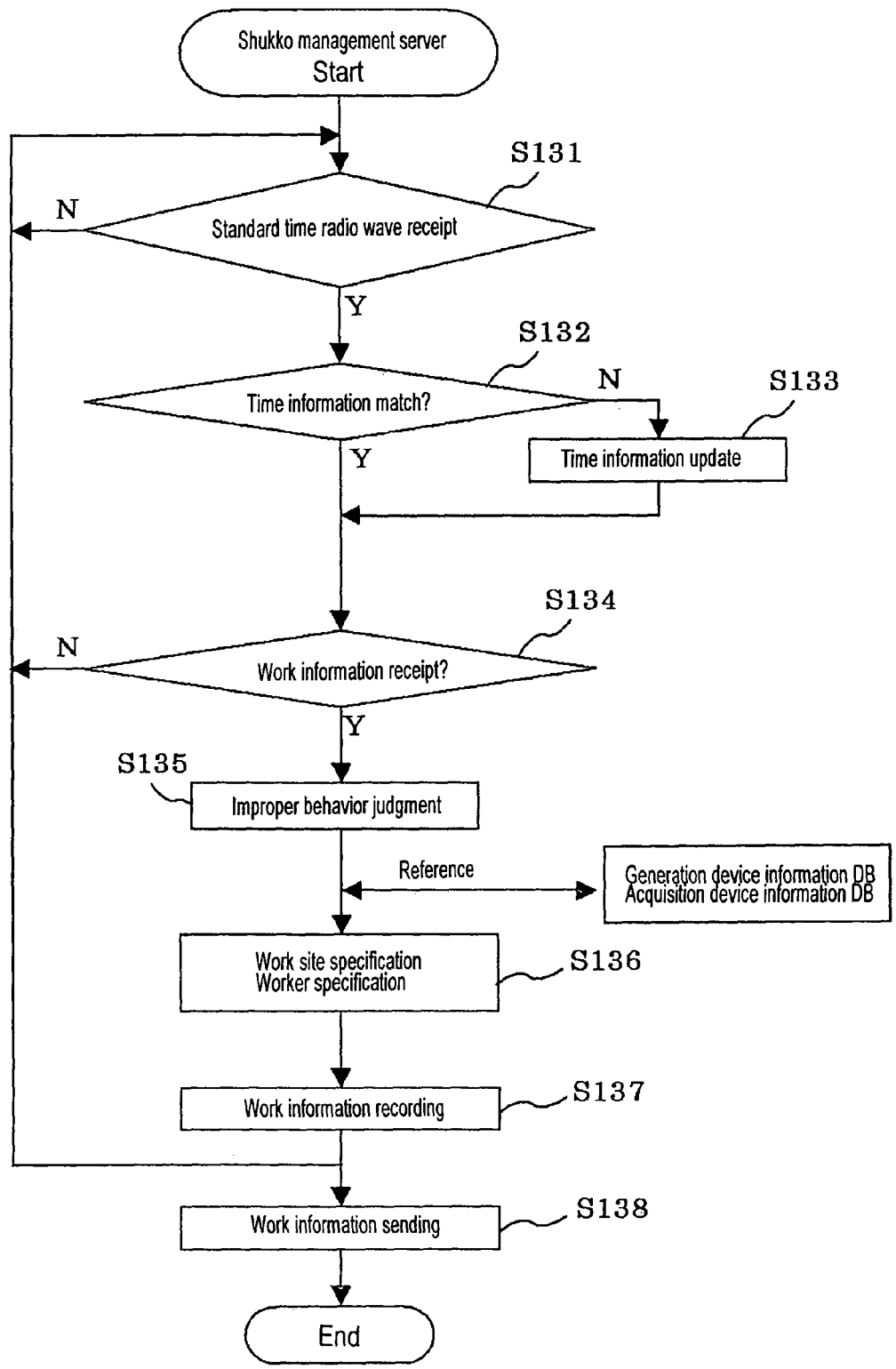
FIG. 10 is a flow chart showing the procedure of the work information collection device in the second system pertaining to an embodiment of the present invention.
Figure 13:
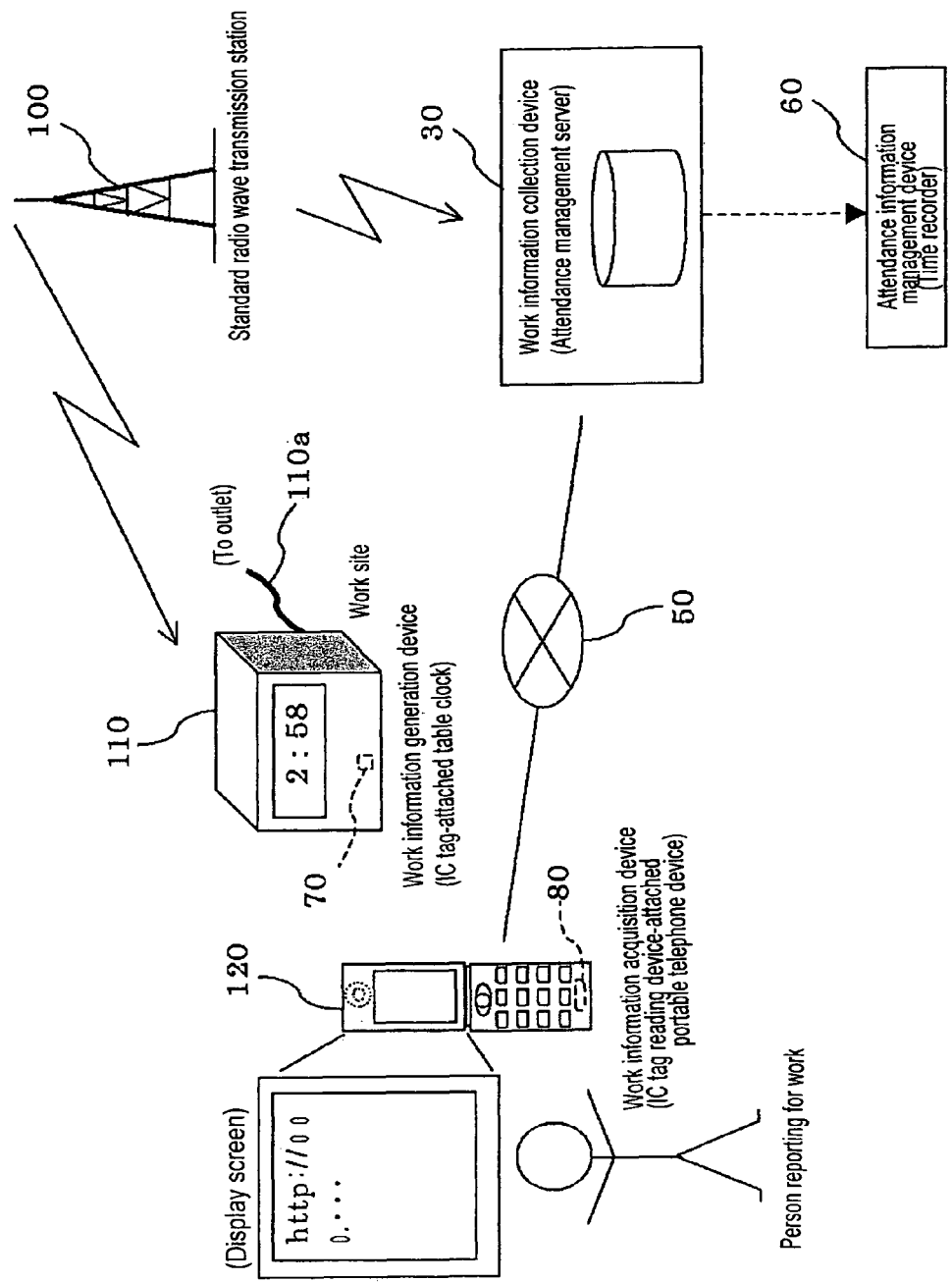
FIG. 13 is a generalized drawing showing an example of another embodiment of the work authentication system pertaining to the present invention.
Figure 14:
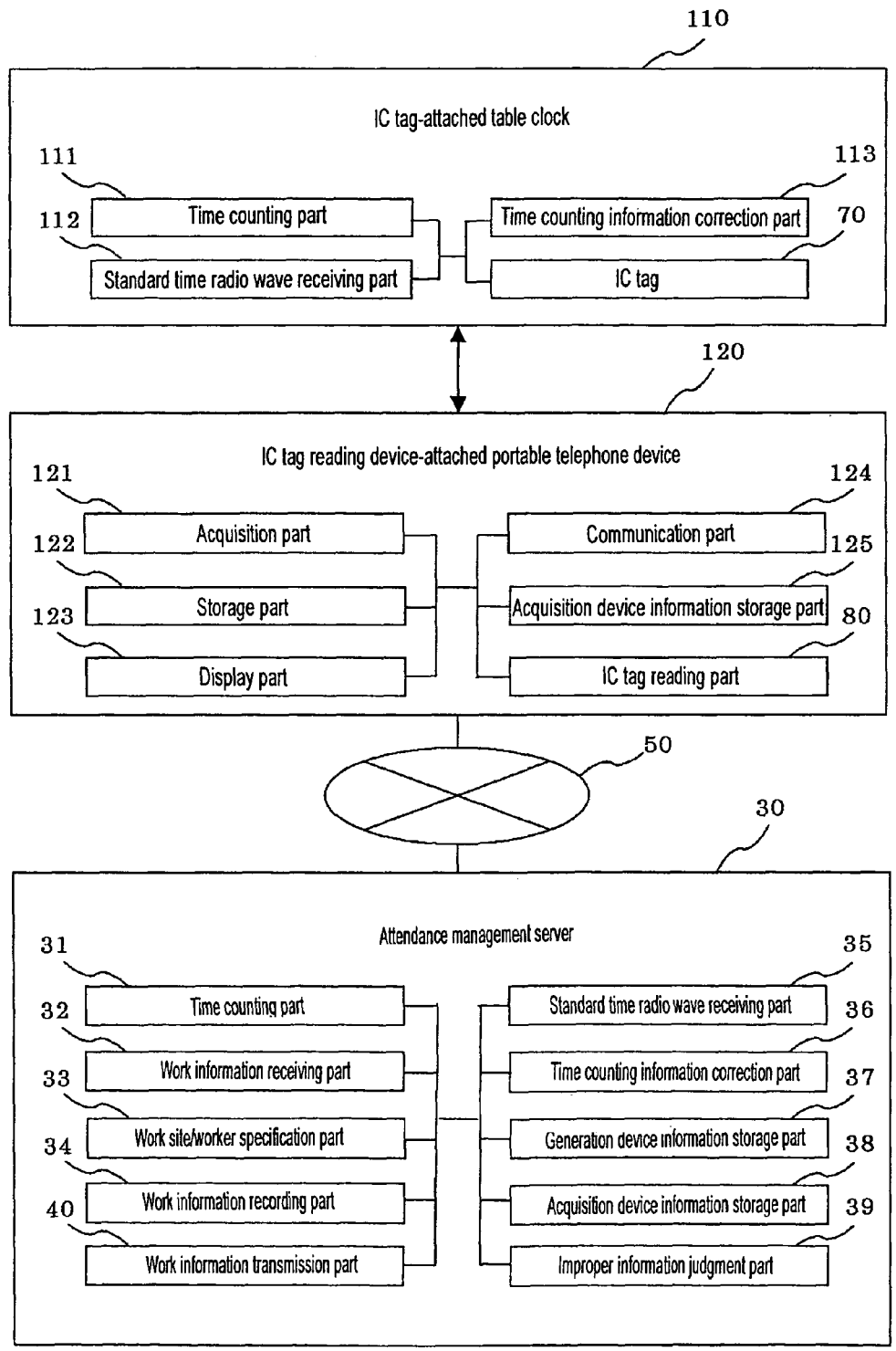
FIG. 14 is a block drawing explaining in general the structure of another system pertaining to an embodiment of the present invention.
Figure 15:
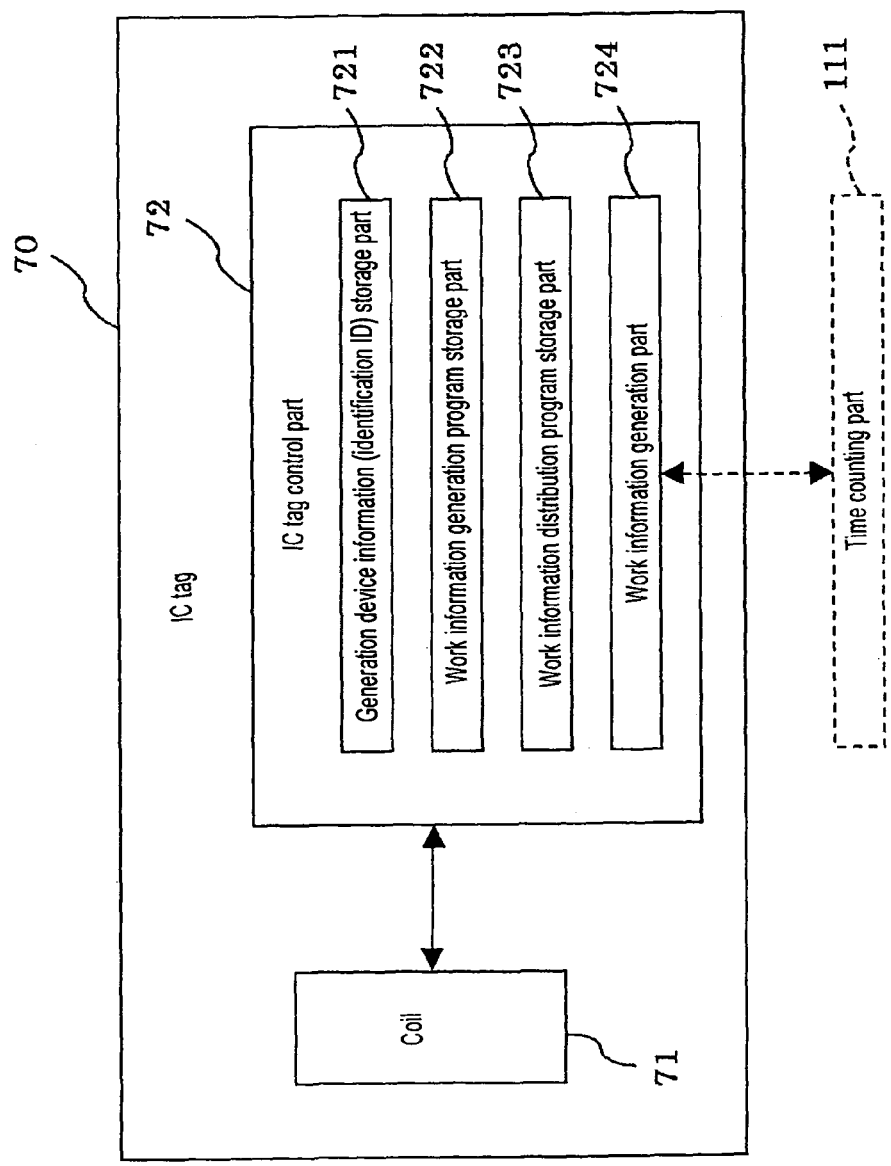
FIG. 15 is a block drawing showing in general the IC tag used in another embodiment of a work authentication system pertaining to the present invention.
Figure 16:
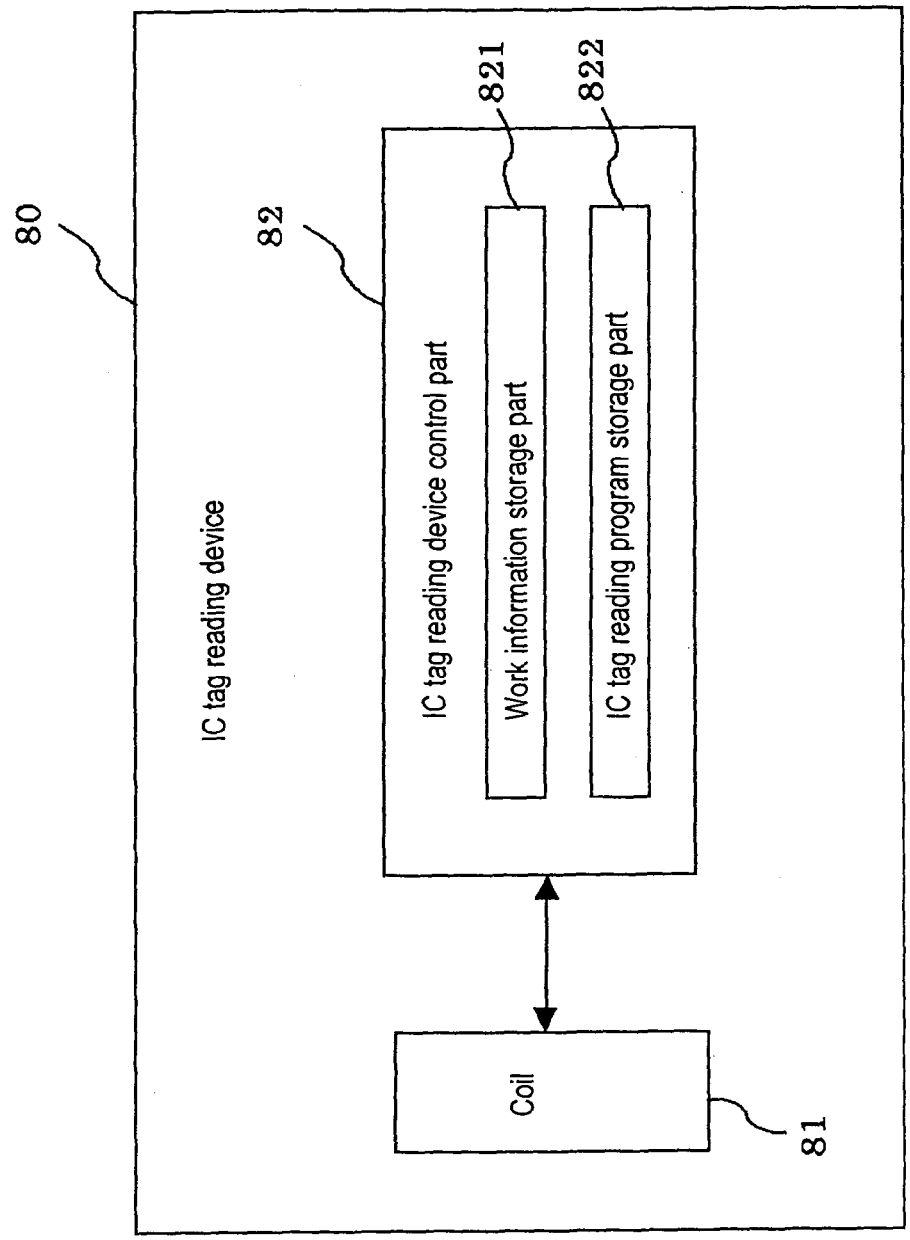
FIG. 16 is a block drawing showing in general the IC tag used in another embodiment of a work authentication system pertaining to the present invention.
Figure 17:
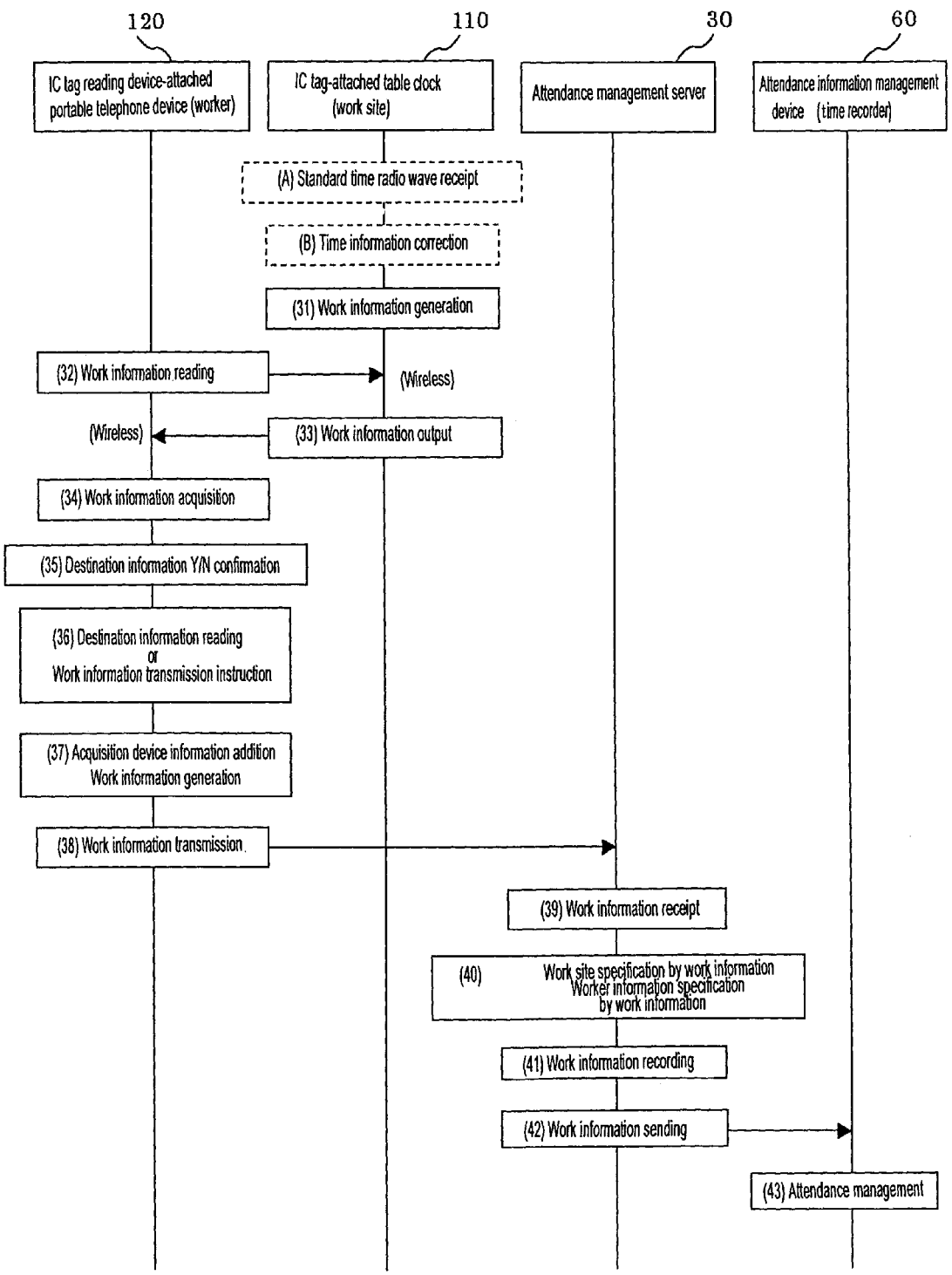
FIG. 17 is a sequence drawing explaining the flow of information in a work authentication system pertaining to the present invention.
Figure 18:
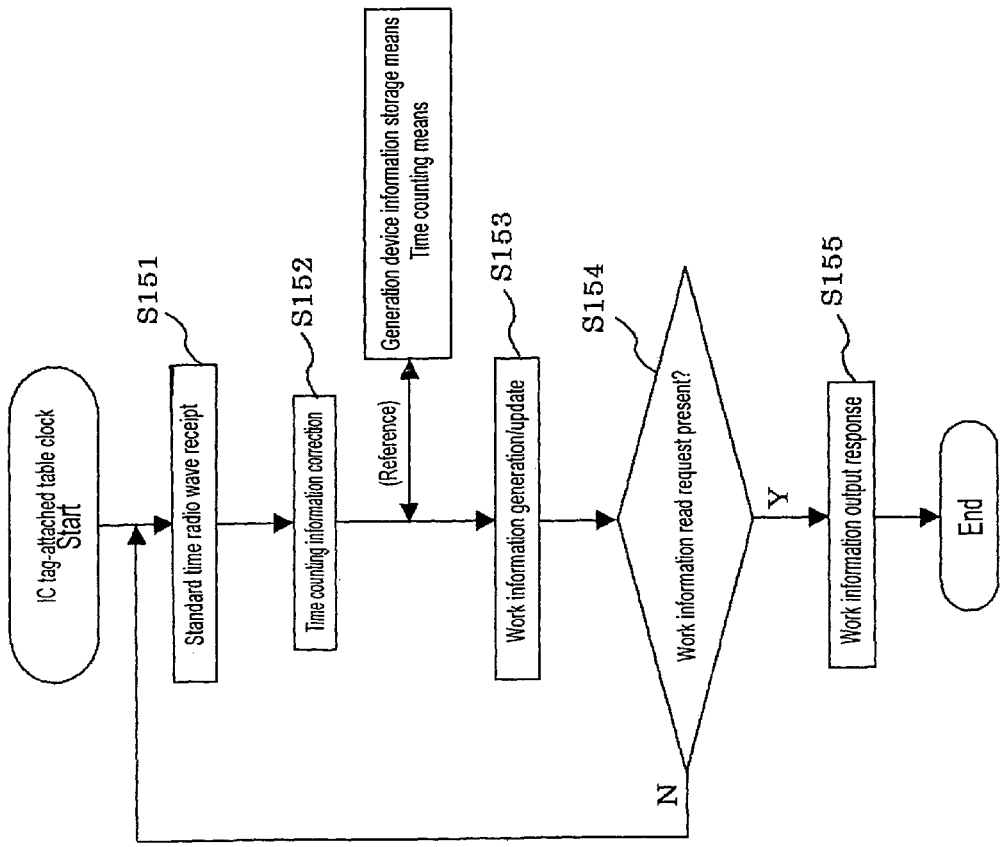
FIG. 18 is a flow chart showing the procedure of the work information generation device in a work authentication system pertaining to the present invention.
Figure 19:
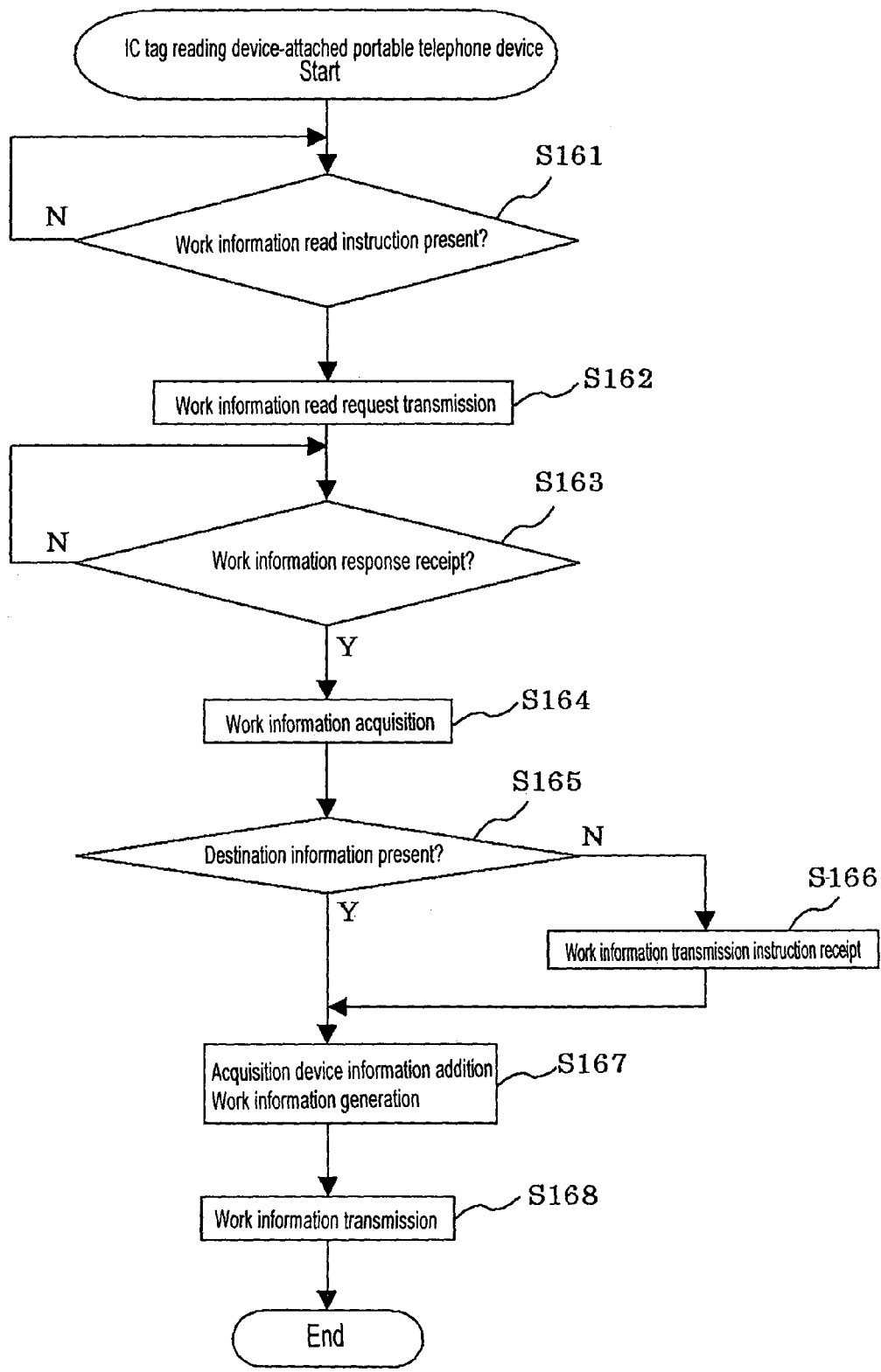
FIG. 19 is a flow chart showing the procedure of the work information acquisition device in a work authentication system pertaining to the present invention.

10 . . . work information generation device (barcode-attached table clock, 20 . . . work information acquisition device (camera-attached portable telephone device, 30 . . . work information collection device (server), 50 . . . network, 60 . . . attendance information management device (internet time recorder), 70 . . . IC tag, 80 . . . ID tag reading device, 100 . . . standard radio wave transmission station, 110 . . . work information generation device (IC tag-attached table clock), 120 . . . work information acquisition device (IC tag reading device-attached portable telephone device).

The invention claimed is:

1. A work information processing system, comprising:
a work information generation device located at a work site, for generating work information including time data and identification information of the work information generation device, and
a mobile work information acquisition device separated from the work information generation device and carried by a worker, said mobile work information acquisition device being configured to acquire and store the time data and the identification information of the work information generation device,
wherein the work information generation device comprises:
time counting means for counting time and providing the time data;
information storage means for storing the identification information including a location of the work information generation device;
work information generation means electrically connected to the time counting means and the information storage means, the work information generation means generating, as a barcode changing successively as time goes by, the time data from the time counting means and the identification information from the information storage means;
work information output means electrically connected to the work information generation means, and outputting, as the barcode, the time data and the identification information generated by the work information generation means; and
work information display means for displaying, as the barcode, the work information output from the work information output means; and
wherein the mobile work information acquisition device comprises:
work information acquisition means for wirelessly acquiring the time data and the identification information output as the barcode from the work information display means, the work information acquisition means including imaging means for taking an image of the barcode and a barcode recognition part for decoding the barcode taken as the image;
work information storage means electrically connected to the work information acquisition means for storing decoded time data and the identification information; and
mobile display means for displaying the decoded time data and the identification information so that the decoded time data and the identification information are seen by the mobile work information acquisition device as desired.

2. The work information processing system according to claim 1, further comprising:
a work information collection device separated from the work information generation device and the mobile work information acquisition device and configured to collect the work information of each worker, the work information collection device comprising:
  work site specification part for obtaining the identification information of the work information generation device and locational information of the work information generation device as the barcode, and
  storage means for storing acquired worker identification information, the time data and the locational information extracted from the work information, said acquired worker identification information being associated with the time data and the locational information.

3. The work information processing system as recited in claim 2, further comprising: an attendance information management device configured to be capable of communication with the work information collection device, the attendance information management device processing attendance information including beginning and end of work of the worker.

4. The work information processing system as recited in claim 1, wherein
  the work information output means outputs and responds by wirelessly transmitting the work information generated by the work information generation means in accordance with a work information read request from the work information acquisition means; and
  the work information acquisition means acquires the work information by receiving the work information wirelessly transmitted by the work information output means.

5. The work information processing system as recited in claim 1, further comprising: work instruction receiving means for receiving a work information generation instruction from a worker, wherein when the work instruction receiving means receives the work information generation instruction from the worker, the work information generation means acquires the time data by referring to the time counting means, and generates the work information based on the time data and the identification information of the work information generation device.

6. The work information processing system as recited in claim 1, further comprising:
  means for receiving a standard time radio wave from a standard radio wave transmission source including standard time data; and
  means for correcting the time counted by said time counting means in accordance with received standard time radio wave.

7. A work information processing system as recited in claim 1, wherein the mobile work information acquisition device is a portable telephone device having a camera for taking the image of the encoded work information output to the display.

8. The work information processing system according to claim 7, wherein the mobile display means has a screen for displaying the decoded work information for confirmation of the work information.

9. A non-transitory computer readable medium having computer executable instructions for a work information processing system, comprising:
  communicating a work information generation device, a mobile work information acquisition device, and a work information collection device,
  wherein said work information generation device is located at a work site for generating and outputting work information including time data produced by time counting means provided in the work information generation device and identification information including location of the work information generation device, said work information generation device generating, as a barcode changing successively as time goes by, the time data and locational information,
  wherein said mobile work information acquisition device is separated from the work information generation device and carried by a worker, said work information acquisition device being configured to wirelessly acquire and store the work information as the barcode and communicate with that work information and worker identification information to the work information collection device,
  wherein said work information collection device includes work location information storage means for storing the identification information of the work information generation device and locational information of the work information generation device, said identification information of the work information device being associated with the locational information;
  processing to collect, as the barcode, the work information and the worker identification information output from the mobile work information acquisition device;
  processing to extract and decode the identification information of the work information generation device and the time data included in the acquired work information, and specify the locational information corresponding to the identification information of the work information generation device; and
  processing to store the acquired worker identification information, and the time data and the locational information extracted from the work information, said acquired worker identification information being associated with the time data and the locational information.

10. A non-transitory computer readable medium having computer executable instructions for a work information processing system work, comprising:
  communicating a work information generation device located at a work site, for generating work information including time data and identification information of the work information generation device, with a mobile work information acquisition device separated from the work information generation device and carried by a worker,
  wherein the work information generation device:
  counts time and provides the time data by time counting means;
  stores the identification information including a location of the work information generation device by information storage means;
  generates, as a barcode changing successively as time goes by, the time data and the identification information by work information generation means;
  outputs, as the barcode, the time data and the identification information generated by the work information generation means by work information output means, and
  displays the work information output by the work information output means,
  wherein the mobile work information acquisition device:
  wirelessly acquires the time data and the identification information output as the barcode from a display of the work information generating device, the mobile work information acquisition device taking an image of the barcode by imaging means and decoding the barcode taken as the image by a barcode recognition part;
  stores decoded time data and the identification information by work information storage means; and
  displays the decoded time data and the identification information by display means so that the decoded time data and the identification information is seen by the mobile work information acquisition device as desired.

11. A non-transitory computer readable medium as recited in claim 10, further comprising:
- communicating by the mobile work information acquisition device with a work information collection device;
- processing to extract, at the work information collection device, the identification information of the work information generation device, the time data, and the locational information corresponding to the identification information of the work information generation device; and
- processing to store the acquired worker identification information, and the time data and the locational information extracted from the work information, said acquired worker identification information being associated with the time data and the locational information.

* * * * *